(12) United States Patent
Kondo

(10) Patent No.: US 11,538,493 B2
(45) Date of Patent: Dec. 27, 2022

(54) MAGNETIC DISK DEVICE AND CONTACT DETECTING METHOD OF THE MAGNETIC DISK DEVICE

(71) Applicants: Kabushiki Kaisha Toshiba, Tokyo (JP); Toshiba Electronic Devices & Storage Corporation, Tokyo (JP)

(72) Inventor: Masayuki Kondo, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/468,444

(22) Filed: Sep. 7, 2021

(65) Prior Publication Data
US 2022/0246175 A1    Aug. 4, 2022

(30) Foreign Application Priority Data
Jan. 29, 2021    (JP) .............................. JP2021-013299

(51) Int. Cl.
*G11B 21/21*    (2006.01)
*G11B 5/60*    (2006.01)
*G11B 5/31*    (2006.01)

(52) U.S. Cl.
CPC ............ *G11B 5/607* (2013.01); *G11B 5/3103* (2013.01); *G11B 5/6076* (2013.01); *G11B 21/21* (2013.01)

(58) Field of Classification Search
None
See application file for complete search history.

(56) References Cited

U.S. PATENT DOCUMENTS

| 8,908,317 | B1 | 12/2014 | Aoyagi et al. |
| 8,937,785 | B1 | 1/2015 | Kojima |
| 8,970,978 | B1 | 3/2015 | Knigge et al. |
| 2010/0225310 | A1* | 9/2010 | Sudou .................. G11B 5/6064 324/213 |
| 2014/0254040 | A1 | 9/2014 | Liu et al. |
| 2019/0066728 | A1 | 2/2019 | Okubo |

FOREIGN PATENT DOCUMENTS

JP    2013-182640 A    9/2013

* cited by examiner

*Primary Examiner* — K. Wong
(74) *Attorney, Agent, or Firm* — Allen & Overy LLP

(57) ABSTRACT

According to one embodiment, a magnetic disk device includes a magnetic disk, a magnetic head including a read head, a write head, a heater and the magnetic head, and a sensor and the control section. The control section when applying electric power to the heater, the control section predicts, on the basis of a relationship between a value of the electric power to be applied to the heater and an output value of a spectrum at a pulse frequency of a DC output of the sensor in a state where pulsed electric power is applied to the heater, the output value of the spectrum, and detects contact between the magnetic head and the magnetic disk before the predicted output value of the spectrum becomes less than or equal to a threshold.

8 Claims, 19 Drawing Sheets

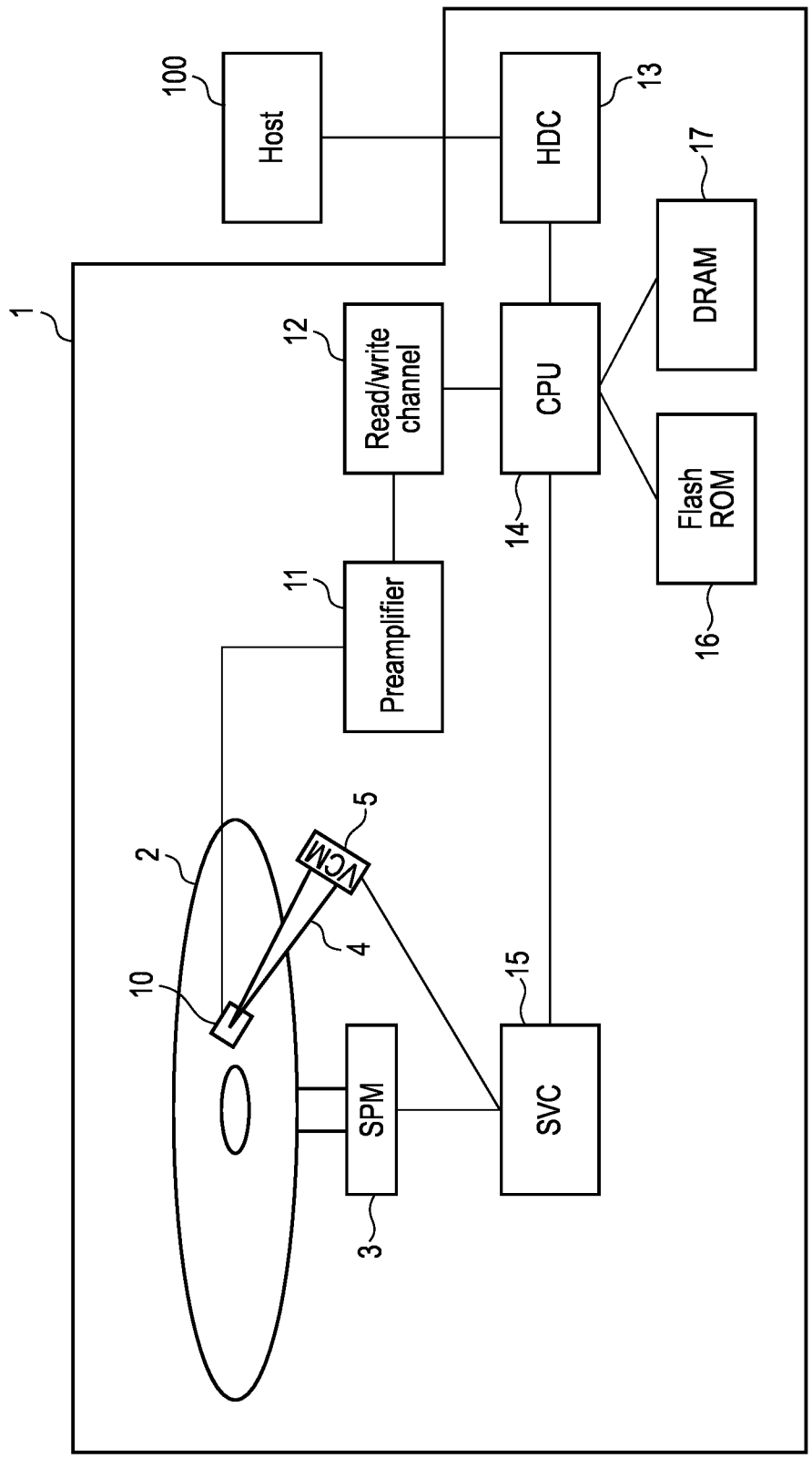
F I G. 1

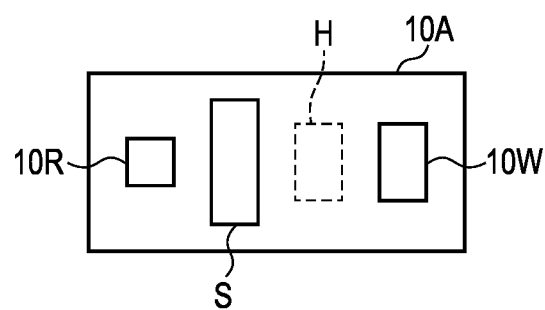
F I G. 4A
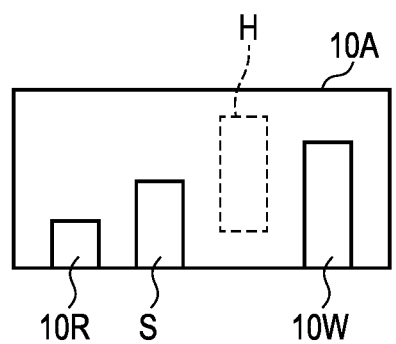
F I G. 4B

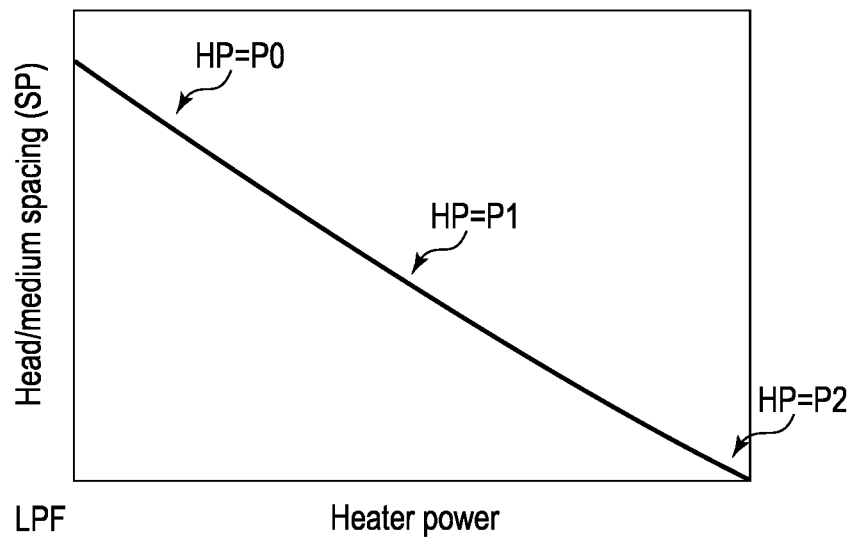
F I G. 6
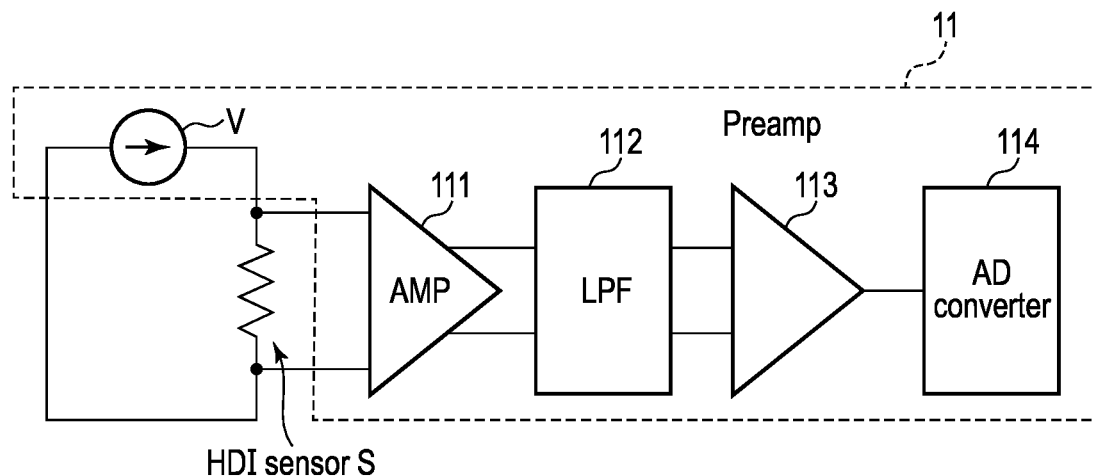
F I G. 7

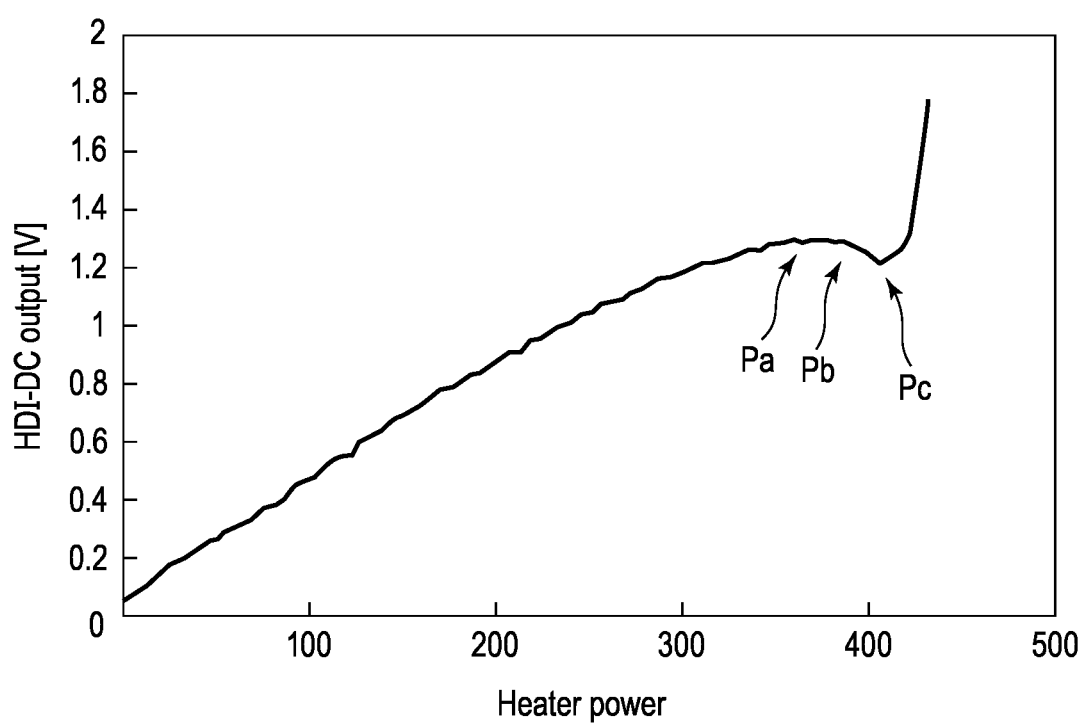
F I G. 8

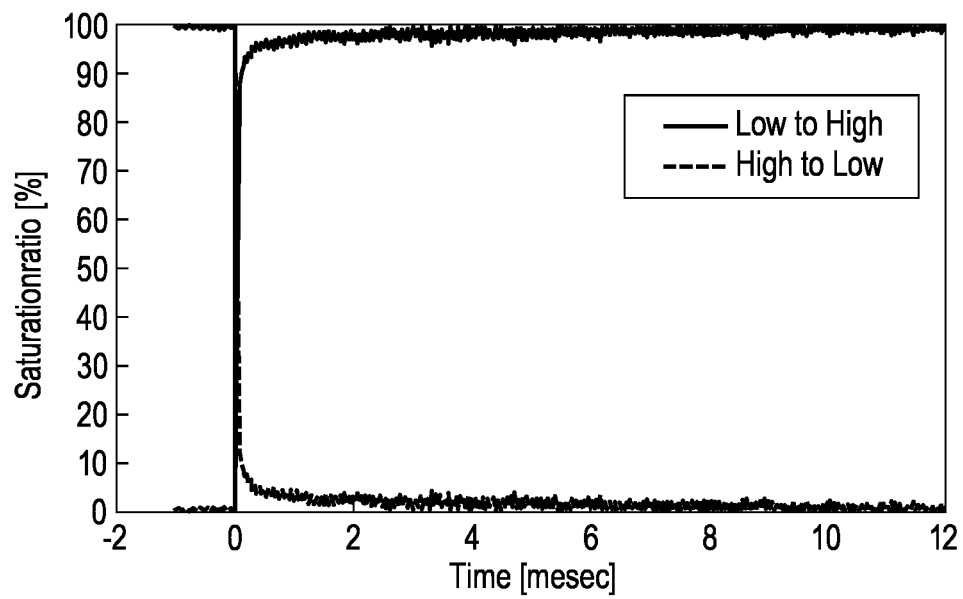
F I G. 10
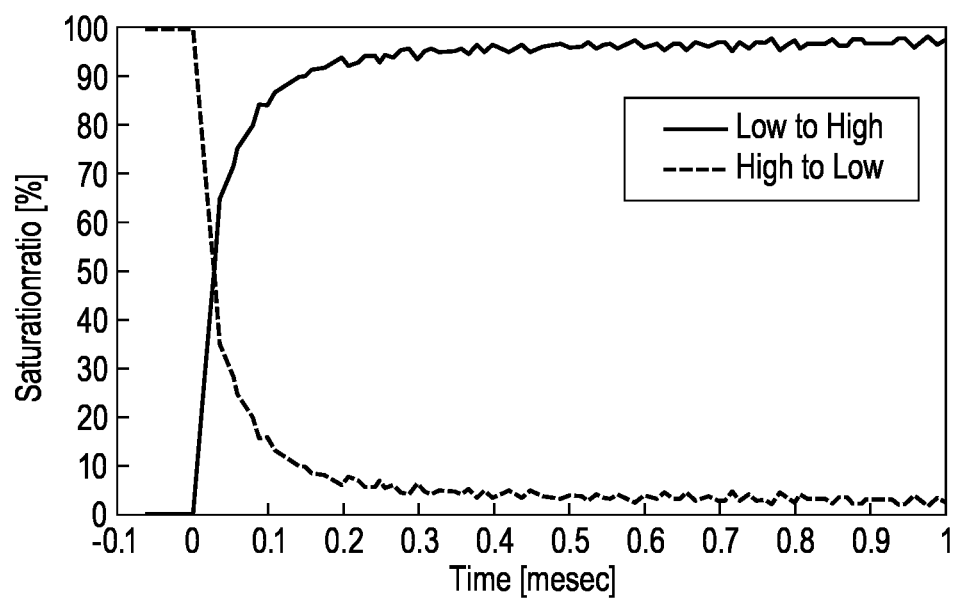
F I G. 11

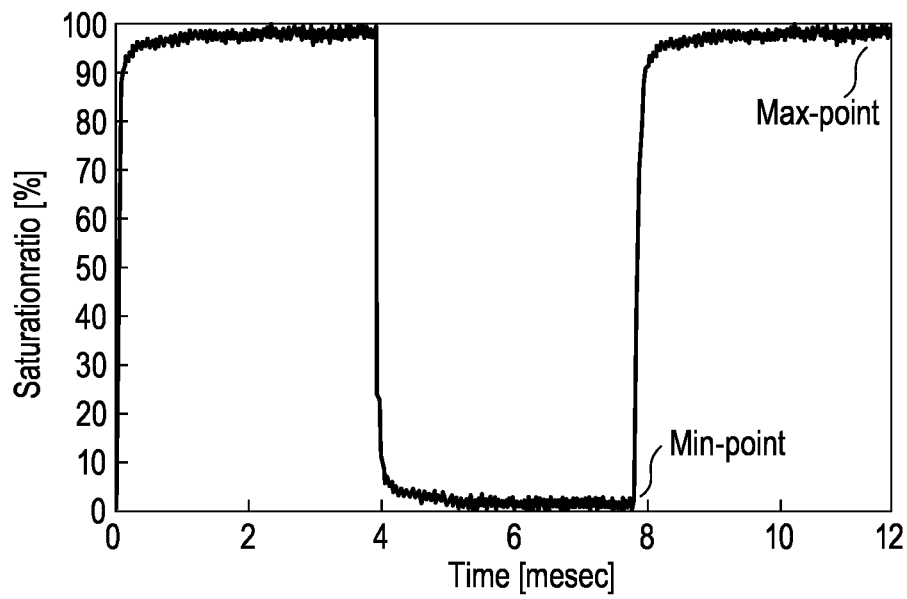
F I G. 12
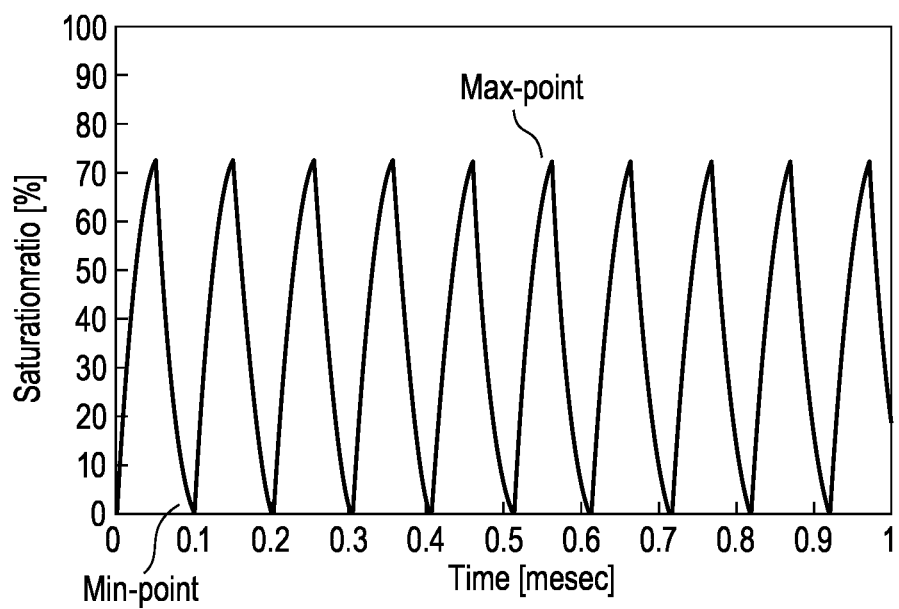
F I G. 13

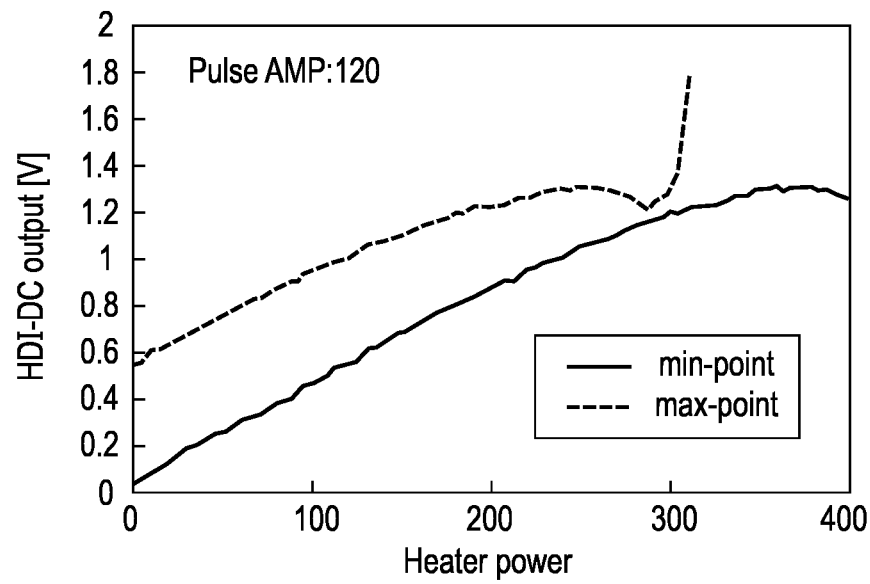
F I G. 14
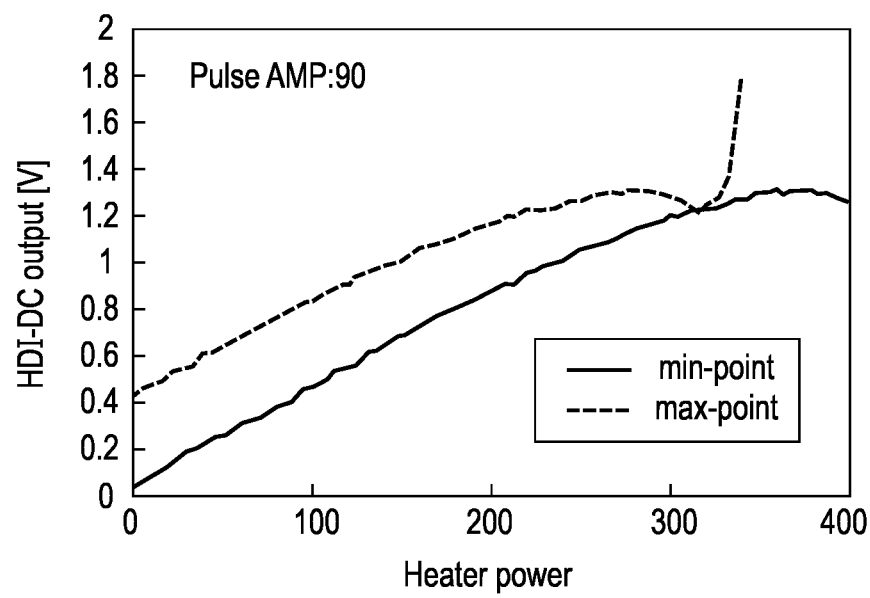
F I G. 15

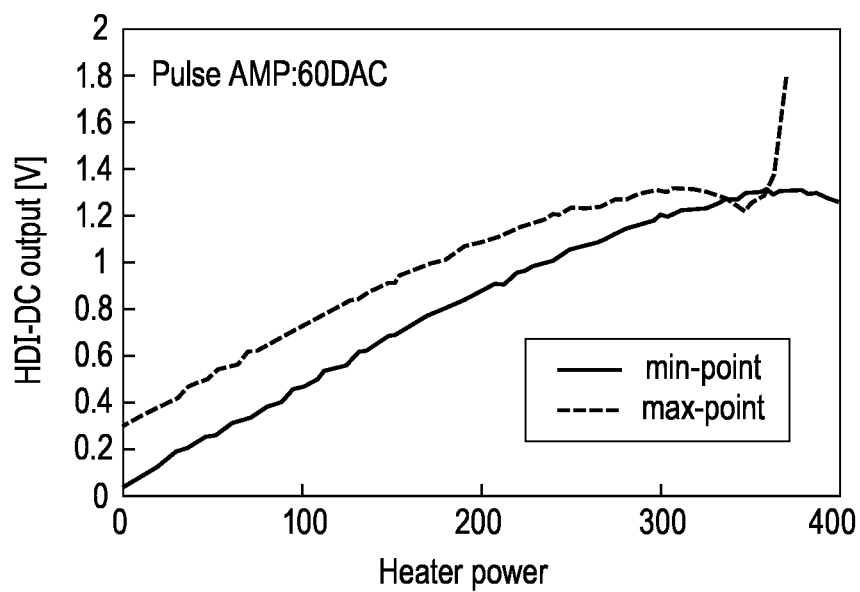
F I G. 16
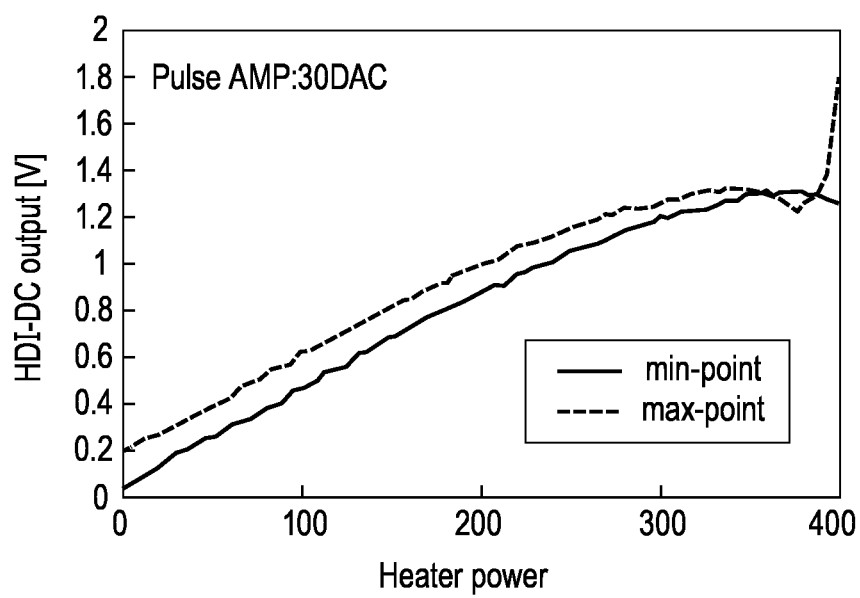
F I G. 17

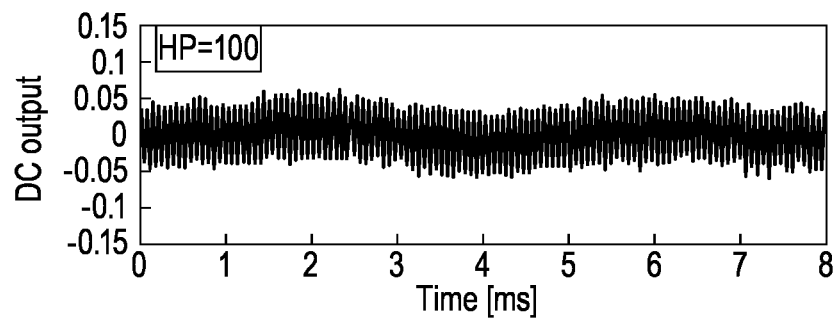
F I G. 20
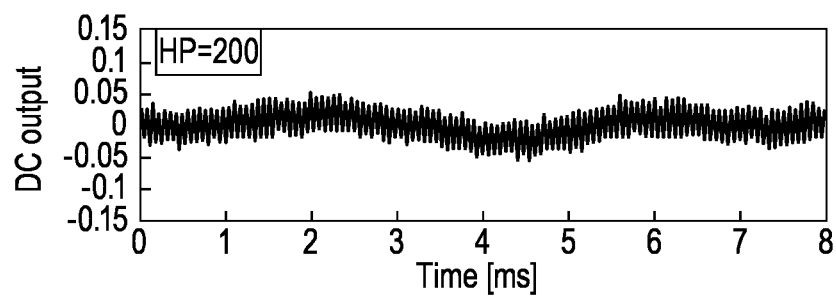
F I G. 21
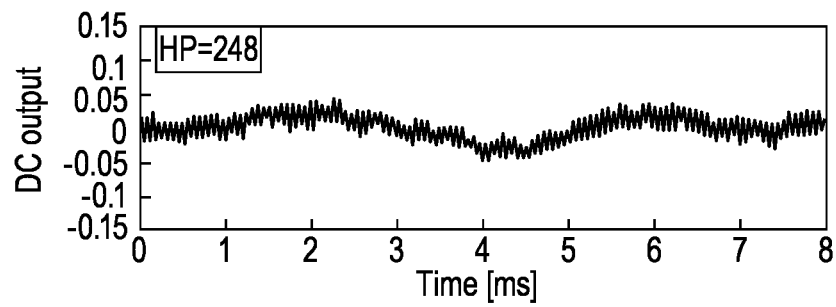
F I G. 22

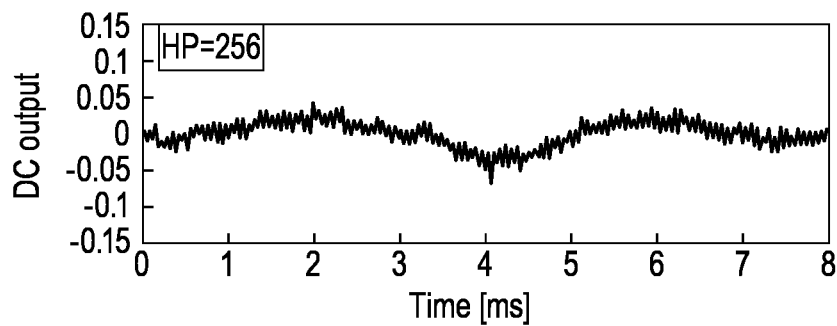
F I G. 23
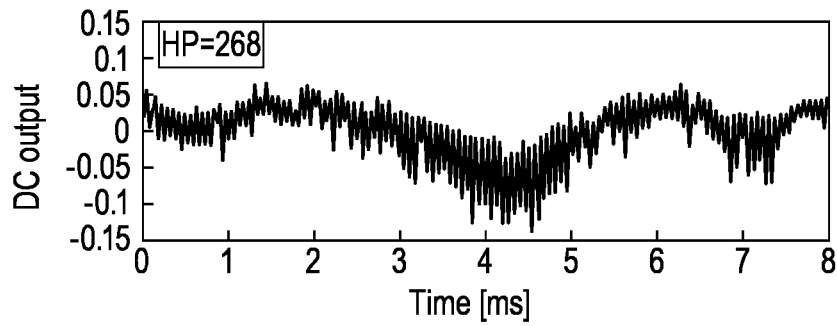
F I G. 24
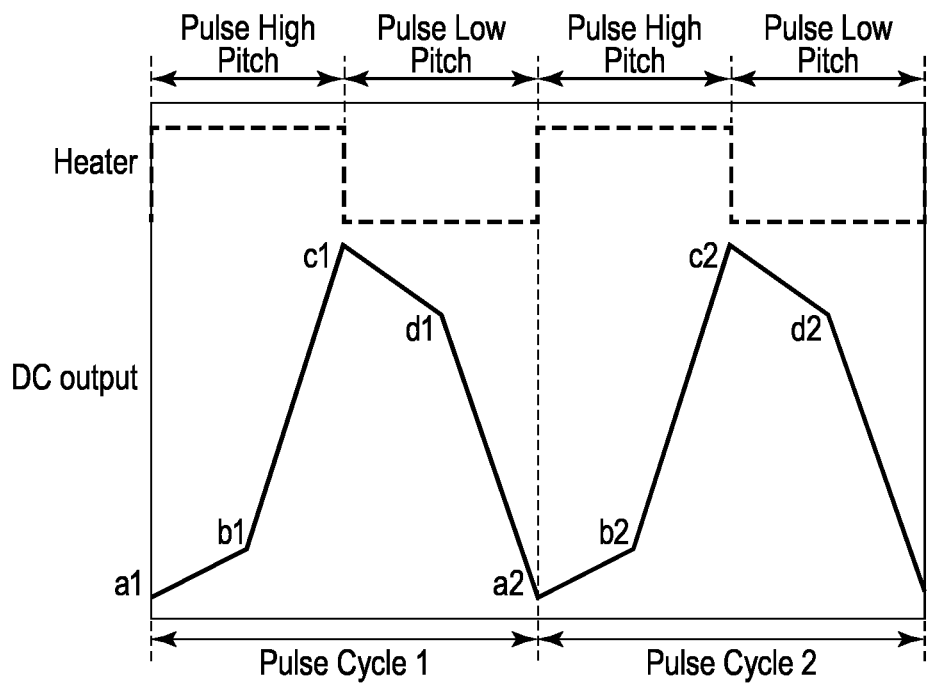
F I G. 25

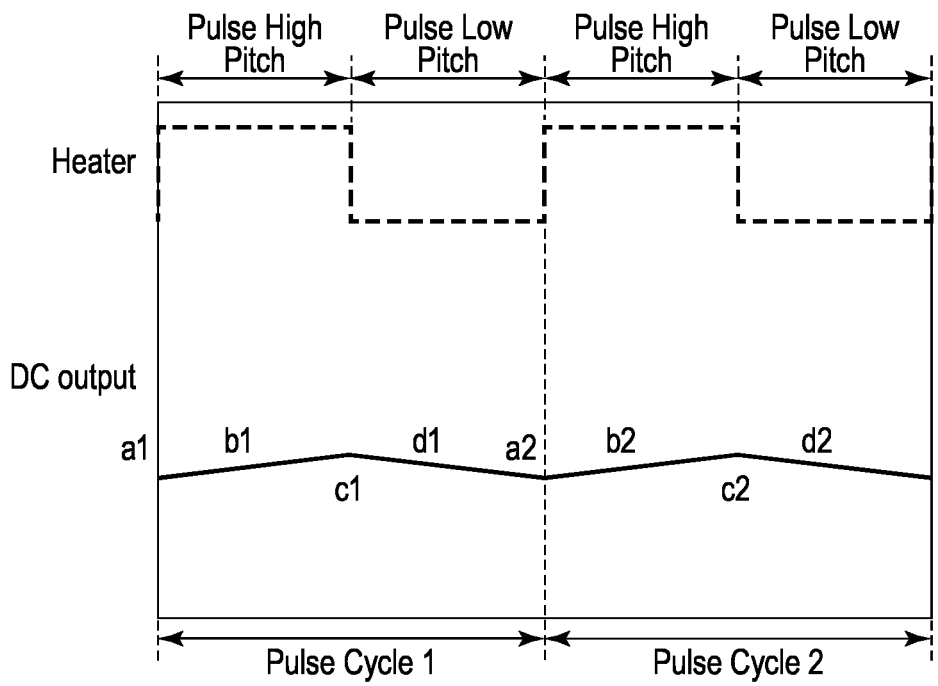
F I G. 26
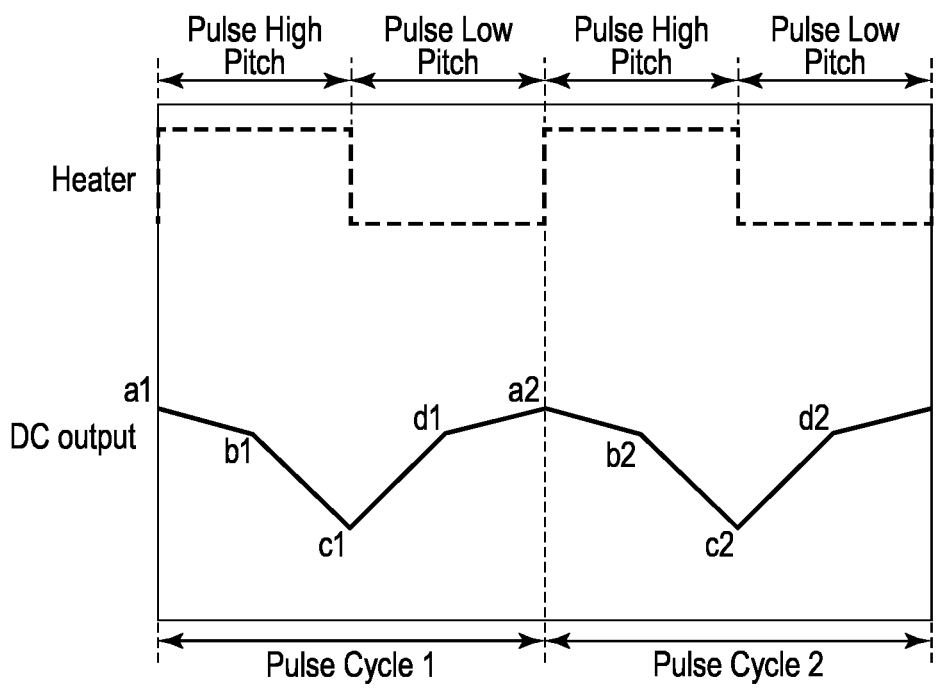
F I G. 27

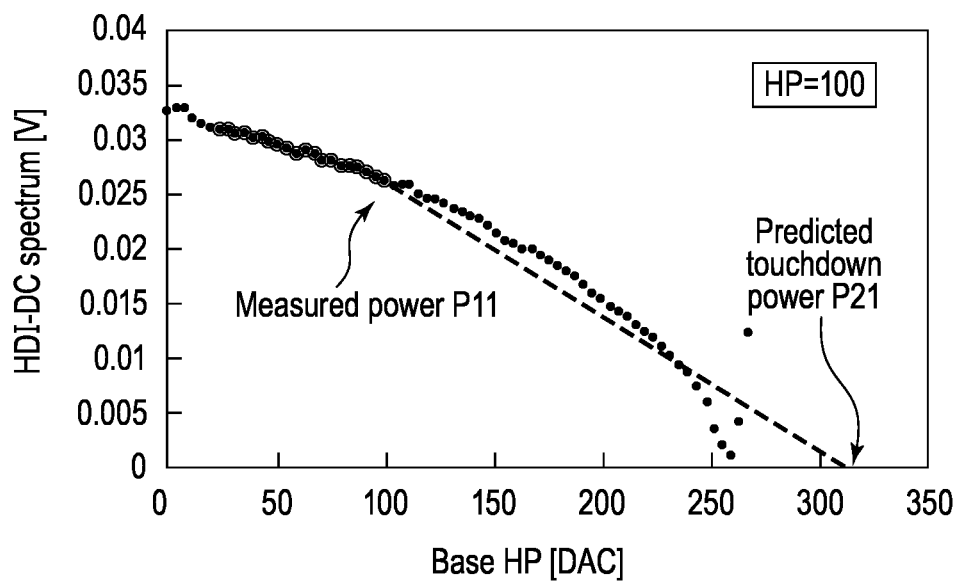
F I G. 28
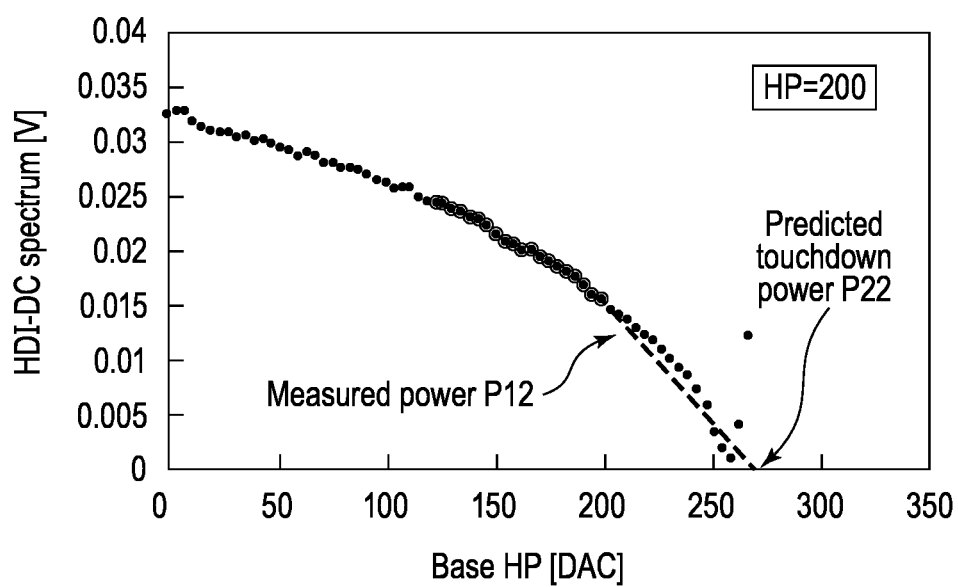
F I G. 29

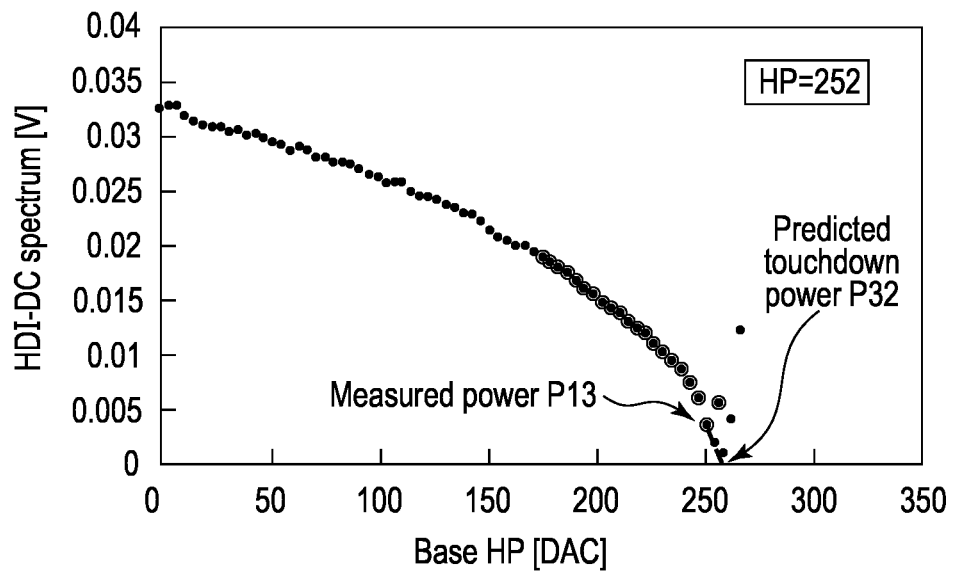
F I G. 30
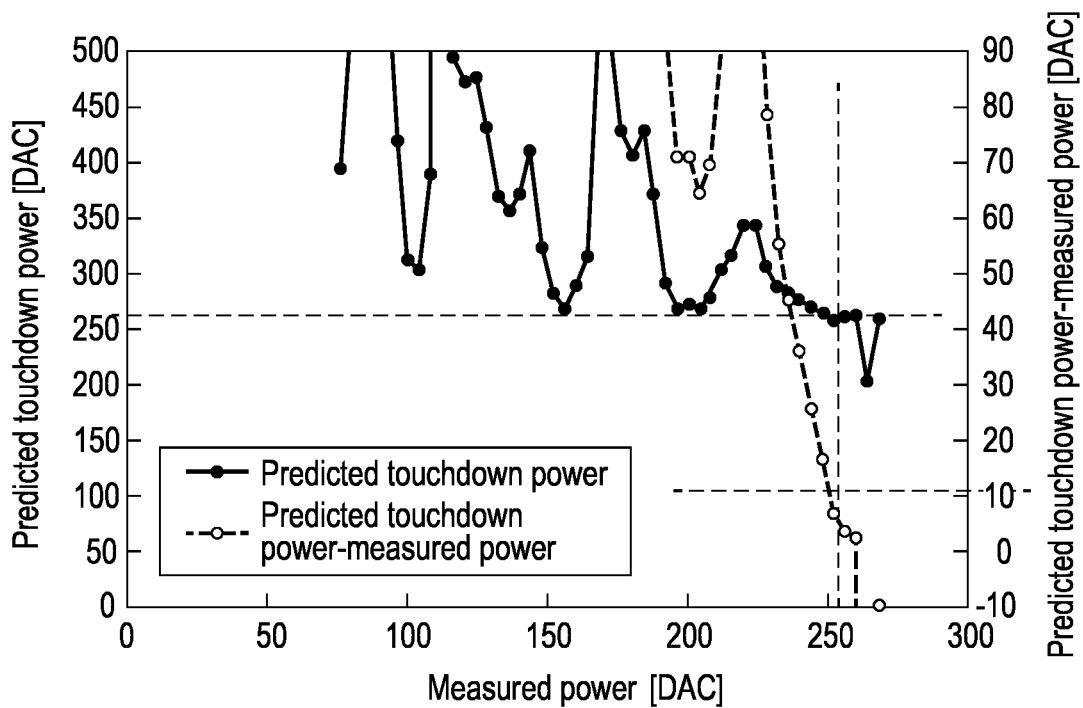
F I G. 31

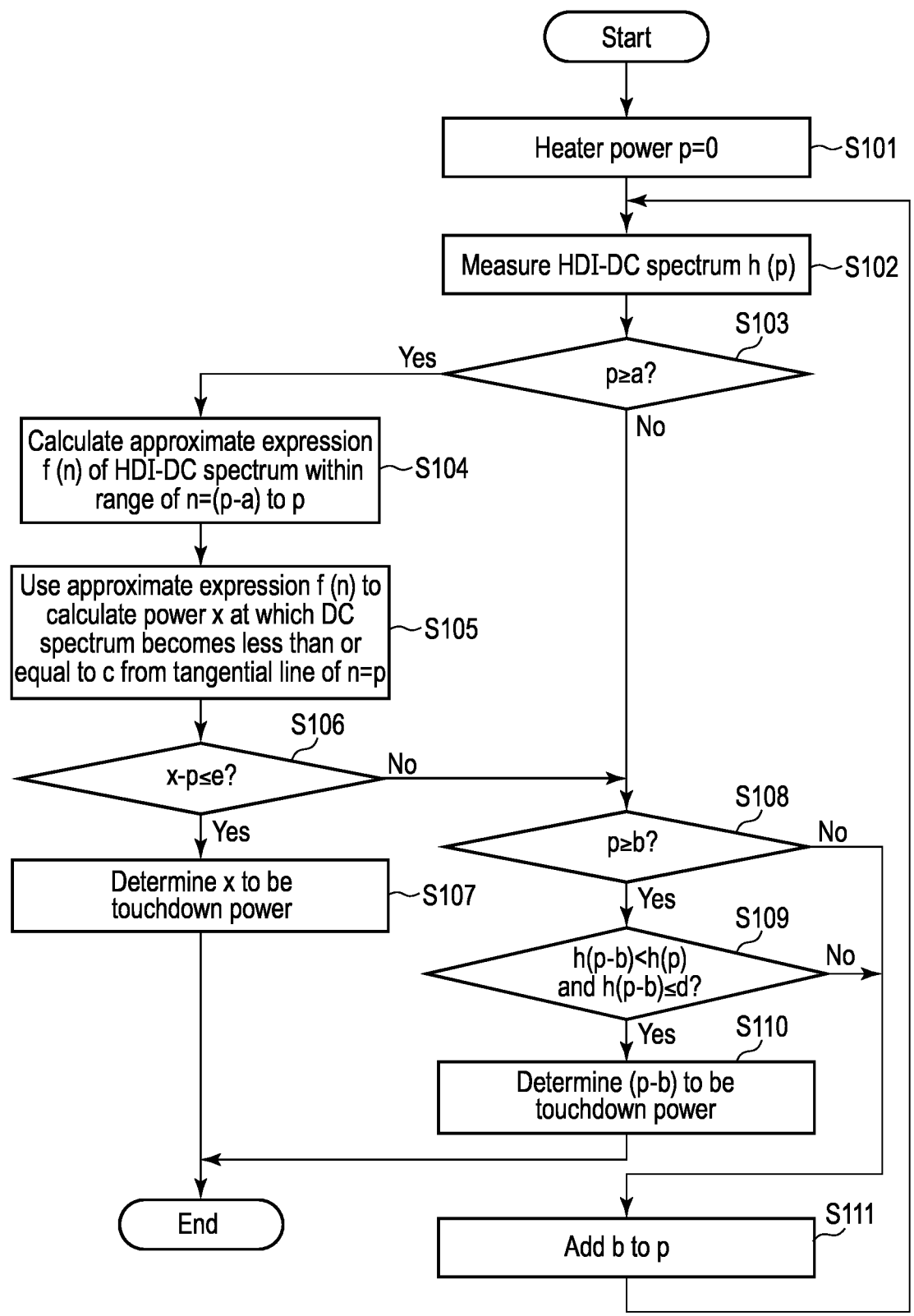
F I G. 32

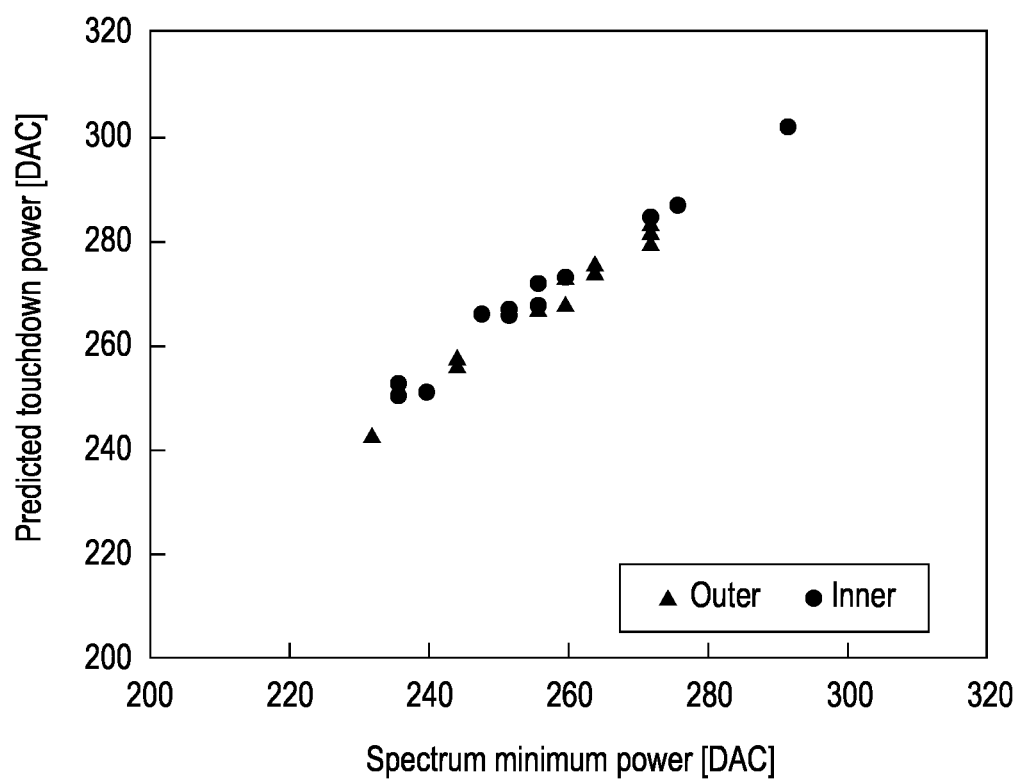
F I G. 33

MAGNETIC DISK DEVICE AND CONTACT DETECTING METHOD OF THE MAGNETIC DISK DEVICE

CROSS-REFERENCE TO RELATED APPLICATIONS

This application is based upon and claims the benefit of priority from Japanese Patent Application No. 2021-013299, filed Jan. 29, 2021, the entire contents of which are incorporated herein by reference.

FIELD

Embodiments described herein relate generally to a magnetic disk device and contact detecting method of the magnetic disk device.

BACKGROUND

In a magnetic disk device, a technique of detecting contact between a magnetic disk and magnetic head is known. This technique is also called touchdown detection (determination). Regarding this touchdown detection, a determination whether or not a touchdown has occurred is made by observing a sway or shake of the magnetic head at the time when the magnetic head comes into contact with the magnetic disk, variation in the read output or variation in the output of a gap detection sensor and the like as an index value. It is difficult, in order to determine a variation of an index value greater than or equal to a certain threshold to be a touchdown, to fix a threshold for detection without using a method as described above. Further, it is also difficult, in order to capture a sudden change, to calculate a predicted value by mathematizing an index value of heater power for pushing out the magnetic head toward the magnetic disk. Accordingly, it is necessary to apply heater power until the index value completely exceeds the threshold. However, this state is a state where the magnetic head and magnetic disk are in complete contact with each other, and hence the state causes a burden to the magnetic head such as abrasion/heat generation or the like, and this can be a failure factor.

Embodiments described herein aim to provide a magnetic disk device and contact detecting method of the magnetic disk device capable of detecting a touchdown while avoiding contact between the magnetic head and magnetic disk.

BRIEF DESCRIPTION OF THE DRAWINGS

FIG. 1 is a view showing an example of the schematic configuration of a magnetic disk device according to a first embodiment.

FIG. 4A is a view showing an example of an undersurface of a head element according to the first embodiment.

FIG. 4B is a view showing an example of a side surface of the head element according to the first embodiment.

FIG. 6 is a view showing an example of a relationship of an amount of the spacing between the magnetic head and magnetic disk with the heater power according to the first embodiment.

FIG. 7 is a schematic view for observing a DC output of a sensor according to the first embodiment.

FIG. 8 is a view showing an example of a result of observing the DC output of the sensor while keeping the heater power to be applied to the heater in a fixed state relatively to the time axis, and gradually increasing the heater power according to the first embodiment.

FIG. 10 is a view showing an example of the DC output of the sensor at the time when the heater power is changed according to the first embodiment.

FIG. 11 is a view obtained by enlarging a part of FIG. 10 according to the first embodiment.

FIG. 12 is a view showing an example of the DC output (low frequency) of the sensor at the time of pulse drive according to the first embodiment.

FIG. 13 is a view showing an example of the DC output (high frequency) of the sensor at the time of pulse drive according to the first embodiment.

FIG. 14 is a view showing an example of changes in the DC output of the sensor S relative to the base heater power at each of the output maximum point of the DC output and output minimum point of the DC output according to the first embodiment.

FIG. 15 is a view showing an example of changes in the DC output of the sensor S relative to the base heater power at each of the output maximum point of the DC output and output minimum point of the DC output according to the first embodiment.

FIG. 16 is a view showing an example of changes in the DC output of the sensor S relative to the base heater power at each of the output maximum point of the DC output and output minimum point of the DC output according to the first embodiment.

FIG. 17 is a view showing an example of changes in the DC output of the sensor S relative to the base heater power at each of the output maximum point of the DC output and output minimum point of the DC output according to the first embodiment.

FIG. 20 is a view showing an example of a relationship between the time and DC output when the heater power is "100" according to the first embodiment.

FIG. 21 is a view showing an example of a relationship between the time and DC output when the heater power is "200" according to the first embodiment.

FIG. 22 is a view showing an example of a relationship between the time and DC output when the heater power is "248" according to the first embodiment.

FIG. 23 is a view showing an example of a relationship between the time and DC output when the heater power is "256" according to the first embodiment.

FIG. 24 is a view showing an example of a relationship between the time and DC output when the heater power is "268" according to the first embodiment.

FIG. 25 is a view schematically showing an example of a change in the DC output of the sensor S relative to the heater power HP of the pulse amplitude width according to the first embodiment.

FIG. 26 is a view schematically showing an example of a change in the DC output of the sensor S relative to the heater power HP of the pulse amplitude width according to the first embodiment.

FIG. 27 is a view schematically showing an example of a change in the DC output of the sensor S relative to the heater power HP of the pulse amplitude width according to the first embodiment.

FIG. 28 is a view showing an example of a relationship of the predicted touchdown power with the measured power obtained by measuring the heater power according to a second embodiment.

FIG. 29 is a view showing an example of a relationship of the predicted touchdown power with the measured power obtained by measuring the heater power according to the second embodiment.

FIG. 30 is a view showing an example of a relationship of the predicted touchdown power with the measured power obtained by measuring the heater power according to the second embodiment.

FIG. 31 is a view showing an example of a difference between the predicted touchdown power and measured power according to the second embodiment.

FIG. 32 is a flowchart showing an example of prediction processing of the touchdown power according to the second embodiment.

FIG. 33 is a view showing an example of a result of obtaining the measured touchdown power and predicted touchdown power at a plurality of magnetic heads and at both the outer circumferential position and inner circumferential position of the magnetic disk according to the second embodiment.

DETAILED DESCRIPTION

Figure 2:
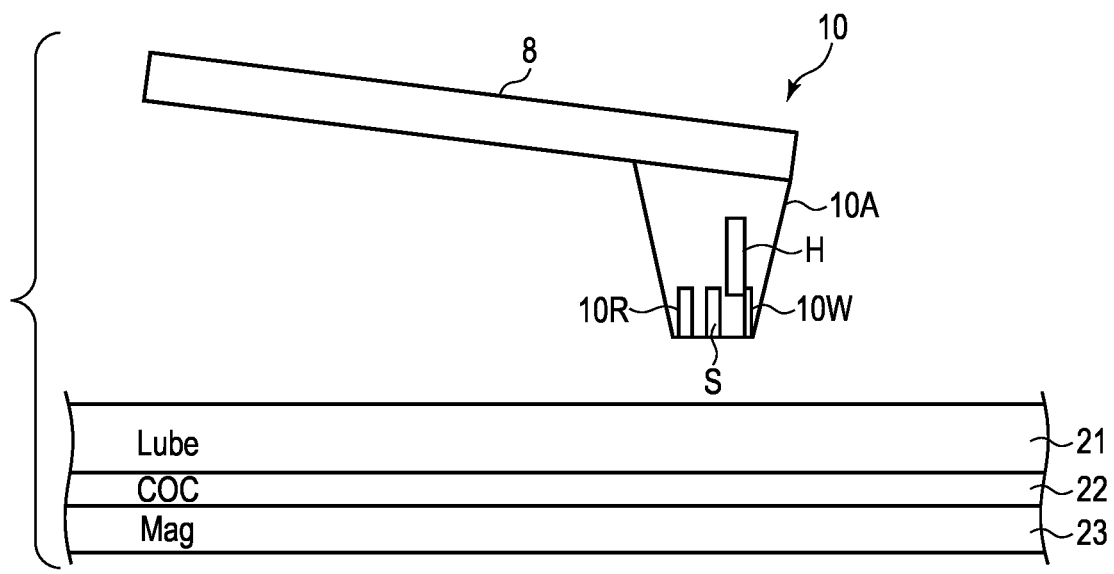
FIG. 2 is a view showing an example of a cross section of each of the magnetic head and magnetic disk according to the first embodiment.

In general, according to one embodiment, a magnetic disk device comprises a magnetic disk, a magnetic head including a read head configured to read data from the magnetic disk, a write head configured to write data to the magnetic disk, a heater configured to adjust a distance between the magnetic disk and the magnetic head, and a sensor configured to detect the distance, and a control section configured to adjust the distance by applying electric power to the heater. when applying electric power to the heater, the control section predicts, on the basis of a relationship between a value of the electric power to be applied to the heater and an output value of a spectrum at a pulse frequency of a DC output of the sensor in a state where pulsed electric power is applied to the heater, the output value of the spectrum, and detects contact between the magnetic head and the magnetic disk before the predicted output value of the spectrum becomes less than or equal to a threshold.

Embodiments will be described hereinafter with reference to the accompanying drawings. Note that the disclosure is merely an example, and the invention is not limited by the contents of the embodiments provided below. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First Embodiment

FIG. 1 is a view showing an example of the schematic configuration of a magnetic disk device 1.

As shown in FIG. 1, the magnetic disk device 1 is configured as, for example, a hard disk drive (HDD) and is provide with a magnetic disk 2, spindle motor (SPM) 3, actuator 4, voice coil motor (VCM) 5, magnetic head 10, preamplifier 11, read/write channel (R/W channel) 12, hard disk controller (HDC) 13, microprocessor (CPU) 14, servo combo (SVC) 15, flash ROM 16, and DRAM 17. Further, the magnetic disk device 1 is configured to be connectable to a host computer (host) 100. It should be noted that the R/W channel 12, HDC 13, and CPU 14 may also be configured to be incorporated into a one-chip integrated circuit.

The magnetic disk 2 includes a substrate constituted of a non-magnetic material and formed into a circular disk-like shape. The magnetic disk 2 is fixed to the spindle motor (SPM) 3 and is rotated at a predetermined rotational speed by the SPM 3. It should be noted that the number of the magnetic disk 2 is not limited to one, and a plurality of magnetic disks 2 may also be attached to the SPM 3. The SPM 3 is driven by a drive current (or drive voltage) to be supplied thereto from the SVC 15. A data pattern is recorded/reproduced on/from the magnetic disk 2 by the magnetic head 10.

The actuator 4 is provided in such a manner that the actuator 4 can freely be turned, and the magnetic head 10 is supported on the tip part of the actuator 4. The actuator 4 is turned by the voice coil motor (VCM) 5, whereby the magnetic head 10 is moved to a position on the desired track of the magnetic disk 2 and is positioned there. The VCM 5 is driven by a drive current (or drive voltage) to be supplied thereto from the SVC 15.

The magnetic head 10 includes a slider 8, and write head 10W, read head 10R, heater H, and HDI sensor S which are formed on the slider 8 (see FIG. 2). A plurality of magnetic heads 10 are provided according to the number of the magnetic disks 2.

The preamplifier 11 supplies a write signal (write current) corresponding to write data to be supplied thereto from, for example, the R/W channel 12 to the write head 10W. Further, the preamplifier 11 amplifies a read signal output from the read head 1OR and transmits the amplified read signal to the R/W channel 12. Furthermore, the preamplifier 11 controls power supply to the heater. In addition, the preamplifier 11 transmits an output of the HDI sensor to the R/W channel 12.

The R/W channel 12 is a signal processing circuit configured to process signals relating to read/write. The R/W channel 12 includes a read channel configured to execute signal processing of read data and write channel configured to execute signal processing of write data. The R/W channel 12 converts a read signal into digital data, and decodes read data from the digital data. The R/W channel 12 encodes write data to be transmitted thereto from the HDC 13, and transfers the encoded write data to the preamplifier 11.

The HDC 13 controls write of data to the magnetic disk 2 through the magnetic head 10, preamplifier 11, R/W channel 12, and CPU 14, and read of data from the magnetic disk 2. The HDC 13 constitutes an interface between the magnetic disk device 1 and host 100, and executes transfer control of read data and write data. That is, the HDC 13 functions as a host interface controller configured to receive a signal transmitted from the host 100, and transfer a signal to the host 100. When transferring a signal to the host 100, the HDC 13 executes error correction processing of data of a reproduced signal read by the magnetic head 10 and decoded in accordance with the control of the CPU 14. Further, the HDC 13 receives a command (write command, read command, and the like) transferred thereto from the host 100, and transmits the received command to the CPU 14.

The CPU 14 is the main controller of the magnetic disk device 1, and executes control of a read/write operation and servo control necessary for positioning of the magnetic head 10. The SVC 15 controls drive of the SPM 3 and VCM 5 in accordance with the control of the CPU 14. By driving the VCM 5, the magnetic head 10 is positioned to a target track on the magnetic disk 2. The flash ROM 16 is a nonvolatile memory. The flash ROM 16 stores therein programs to be executed by the CPU 14 and various types of data. The DRAM 17 is a volatile memory. The DRAM 17 is used as a work area or the like when the CPU 14 executes the programs stored in the flash ROM 16.

Figure 3:
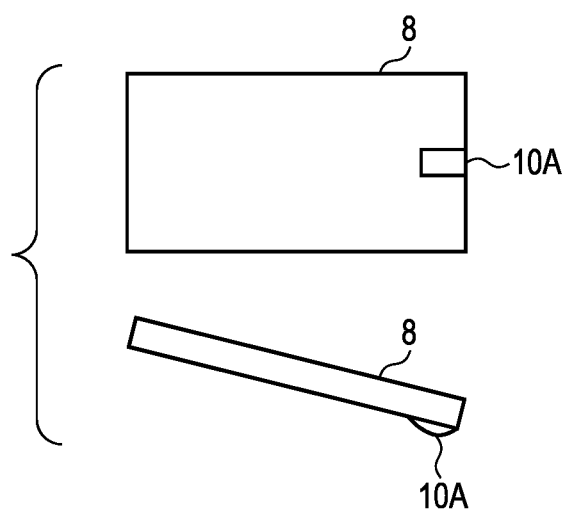
FIG. 3 is a view showing an example of each of an undersurface and side surface of a slider according to the first embodiment.

Each of FIGS. 2 to 4 is a schematic view showing an example of the structure of each of the magnetic head 10 and magnetic disk 2. FIG. 2 is a view showing an example of a cross section of each of the magnetic head 10 and magnetic disk 2, FIG. 3 is a view showing an example of each of an undersurface and side surface of the slider 8, FIG. 4A is a view showing an example of the undersurface of a head element 10A, and FIG. 4B is a view showing an example of a side surface of the head element 10A.

As shown in FIG. 2, the slider 8 included in the magnetic head 10 includes a head element 10A at a tip part thereof, and a write head 10W, read head 10R, HDI sensor S, and heater H are included in the head element 10A. The write head 10W, read head 10R, and HDI sensor S are exposed at the undersurface of the head element 10A, i.e., these members are exposed to the magnetic disk 2. The heater H is provided inside the head element 10A. The magnetic disk 2 has a three-layer structure. Regarding the magnetic disk 2, a COC layer 22 functioning as a protective film is provided on a Mag layer 23 which is constituted of a magnetic material and on which data recording is carried out and, furthermore, a Lube layer 21 which is a lubricant is provided on the COC layer 22, and the magnetic disk 2 is formed by stacking these layers on top of each other in layers. Here, the magnetic head 10 side of the magnetic disk 2 is defined as the upper side.

As shown in FIG. 3, the head element 10A is provided at the tip part of the slider 8. Further, as shown in FIG. 4A and FIG. 4B, the write head 10W, HDI sensor S, and read head 10R are provided in the slider 8 in the order described from the tip side (right side of FIG. 3) of the slider 8 in such a manner as to be exposed to the magnetic disk 2. The heater H is provided between the write head 10W and HDI sensor S inside the head element 10A.

The head element 10A is levitated by the wind pressure caused by the rotation of the magnetic disk owing to the action of the slider 8 called air bearing surface (ABS). Thereby, while the magnetic disk 2 is rotated, spacing occurs between the head element 10A and magnetic disk 2. Here, in order to realize high density recording, it is necessary to minimize the distance between the head element 10A and magnetic disk 2 to the utmost limit. As a technique of minimizing the distance, a technique of applying electric power to a heater H inside the head element 10A to thereby heat the head element 10A, and controlling the spacing between the magnetic disk 2 and head element 10A at the time of read/write by the thermal expansion of the head element 10A is generally adopted. The heater H which is a resistance element inside the head element 10A generates heat by receiving electric power from the preamplifier 11. By the deformation of the heater H due to the thermal expansion, only the part of the head element 10A at which the write head 10W, read head 10R, and HDI sensor S are exposed is pushed out toward the magnetic disk 2 side, whereby it becomes possible to adjust the spacing between the head element 10A and magnetic disk 2.

Figure 5:
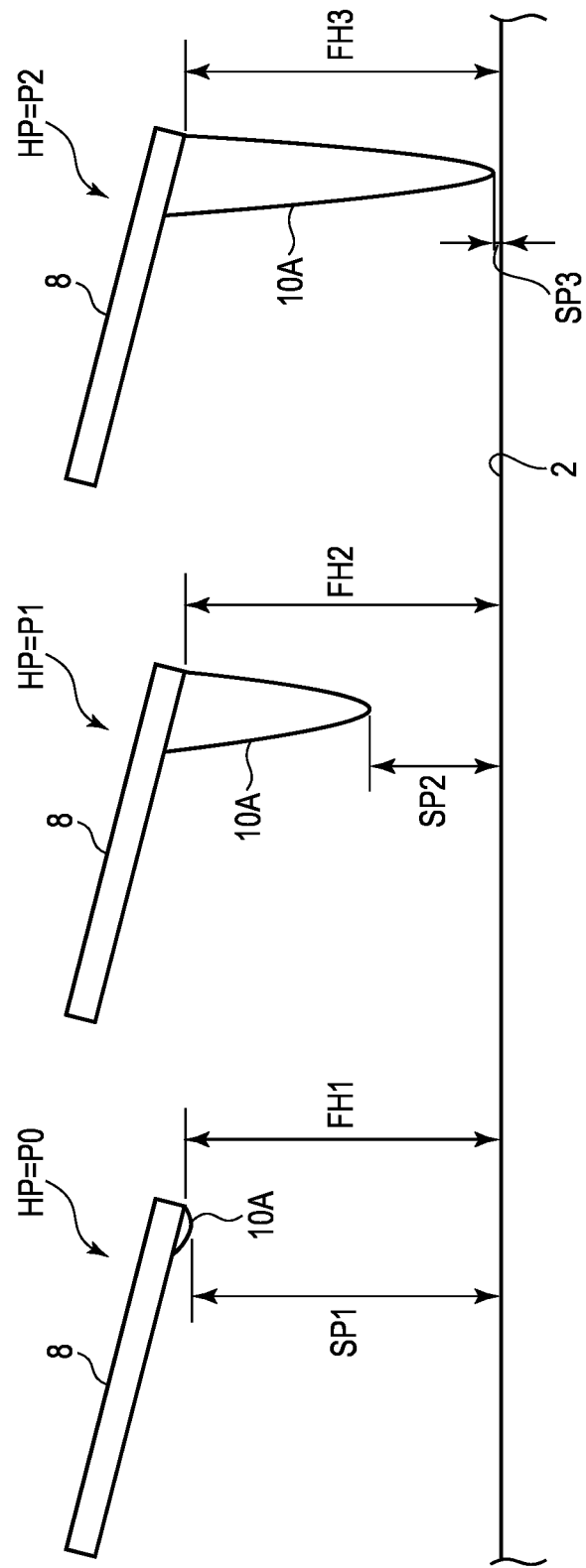
FIG. 5 is a view showing an example of a transition of a state where the head element expands according to the first embodiment.

Each of FIG. 5 and FIG. 6 is a view for explaining an example of spacing control. FIG. 5 is a view showing an example of a transition of a state where the head element 10A expands, and FIG. 6 is a view showing an example of a relationship of an amount of the spacing between the magnetic head 10 and magnetic disk 2 with the heater power. It should be noted that in FIG. 5, the distance FH indicating the distance from the slider 8 to the magnetic disk 2 is expressed by the following relationship. distance FH1=distance FH2=distance FH3.

As shown in FIG. 5, when the heater power is gradually increased from the state where the spacing between the head element 10A with the heater power 0 (HP=0) and magnetic disk 2 is the spacing SP1, the head element 10A of the magnetic head 10 in which the write head 10W and read head 10R are implemented is thermally expanded by the thermal deformation of the heater H. Thereby, the spacing between the tip of the head element 10A and magnetic disk 2 becomes as small as the spacing SP2 as in the state of the heater power P1 (HP=P1). When the heater power is further increased, the spacing becomes the spacing SP3 (=0) in the state of the heater power P2 (HP=P2), this being the touchdown state. In this embodiment, the heater power at this time is called the touchdown power. There are individual differences in the individual magnetic heads 10, and levitation amounts of the sliders 8 relative to the radial positions of the magnetic disk 2. For this reason, in order to adjust the spacing, the work of carrying out touchdown operations on the individual magnetic heads 10 and individual radial positions and, at that time, adjusting the spacing to arbitrary spacing by using the measured touchdown power as the point of reference becomes necessary.

In this embodiment, the touchdown method utilizing the HDI sensor S included in the head element 10A shown in already-described FIG. 2 will be described.

FIG. 7 is a view showing an example of the circuit configuration utilizing the HDI sensor S. More specifically, FIG. 7 shows an example of connection of the HDI sensor S and preamplifier 11 to each other in the DC mode, and is a schematic view for observing the DC output of the HDI sensor S.

As shown in FIG. 7, in this embodiment, the HDI sensor S is a resistance element. A constant current is applied to the HDI sensor S by a power source V. The DC output of the HDI sensor S is output to an analog-to-digital (AD) converter 114 through an amplifier (AMP) 111, low-pass filter (LPF) 112, and comparator 113. Owing to such a configuration, it becomes possible to observe each of a resistance change due to a thermal change at the time when heat is applied to the heater H, and resistance change due to a thermal change caused by a touchdown as a change in the voltage value by means of the AD converter 114. In this embodiment, although the AD converter 114 is described as to the case where an AD converter included in the preamplifier 11 is generally utilized, an AD converter is included in also the R/W channel 12, and hence the AD converter provided in the R/W channel 12 may also be utilized.

FIG. 8 is a view showing an example of a result of observing the DC output (hereinafter also referred to as the "HDI-DC output") of the HDI sensor while keeping the heater power to be applied to the heater H in a fixed state relatively to the time axis, and gradually increasing the heater power. The heater power is applied to the heater H from the preamplifier 11 under the control of the CPU 14.

The heater power is increased through the preamplifier 11 on the basis of the control of the CPU 14, whereby electric power (i.e., heat) is applied to the heater H, and the head element 10A generates heat as described already. Concomitantly with this, the resistance value of the HDI sensor S incorporated in the head element 10A is also increased by the influence of the heat. Thereby, the output value of the HDI sensor S gradually becomes larger with the rise in the heater power, and the distance between the tip face of the head element 10A and magnetic disk 2 becomes smaller. When the distance becomes smaller as described above, the change in the HDI-DC output relative to the heater power gradually becomes less responsive by the influence of air cooling resulting from the rotation of the magnetic disk 2. Then, a section in which the increase of heat by the heater power and decrease of heat by the air cooling are coincident with each other such as the point Pa occurs.

When the CPU 14 further raises the heater power from this state, contact between the tip face of the head element 10A and Lube layer 21 of the magnetic disk 2 occurs. Since the Lube layer 21 is a lubricant, frictional heat to be generated at the time of contact is small, and thus a role of a heat sink in making the heat move to the magnetic disk 2 side through the Lube layer 21 is brought about. Thereby, a section in which the HDI-DC output lowers such as the point Pb occurs.

When the CPU 14 further raises the heater power from this state, the tip face of the head element 10A comes into contact with the COC layer 22 of the magnetic disk 2. When the tip face of the head element 10A comes into contact with the COC layer 22, frictional heat is generated. For this reason, the heat of the head element 10A increases again, and a section in which the HDI-DC output becomes higher occurs again with the point Pc being the starting point thereof. In consideration of the damage to the head element 10A, it is necessary for the CPU 14 to detect a touchdown in the section of the point Pb in which the tip of the head element 10A is on the Lube layer 21 and falls short of the COC layer 22.

Figure 9:
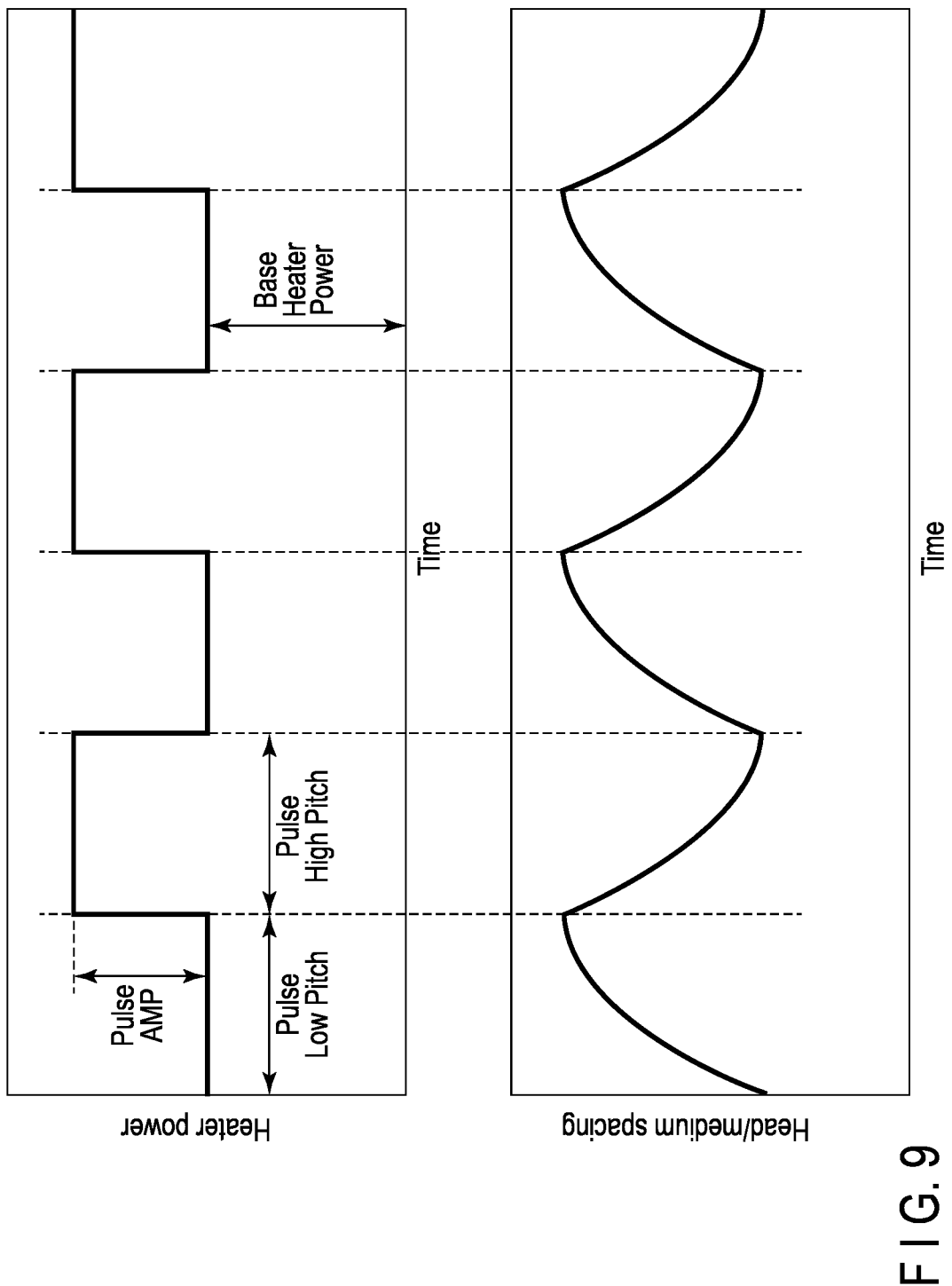
FIG. 9 shows a schematic view showing an example of pulse-driving of the heater, and view showing an example of a change in the levitation at that time according to the first embodiment.

In this embodiment, power is applied to the heater H in a pulsed form relatively to the time axis, and the touchdown is detected by observing the HDI-DC output at the time when the heater H is pulse-driven. FIG. 9 shows a schematic view showing an example of pulse-driving of the heater H (upper side of FIG. 9), and view showing an example of a change in the levitation at that time (lower side of FIG. 9). Here, the term 'a change in the levitation' implies a change in the distance from the recording surface of the magnetic disk 2 to the tip face of the head element 10A, this being synonymous with the already-described spacing.

As shown in FIG. 9, the CPU 14 drives the heater H in the pulsed manner by alternately providing a time period defined by a Pulse_Low_Pitch during which the Base Heater Power is applied to the heater H, and time period defined by a Pulse High Pitch during which the heater power obtained by adding an amount corresponding to the pulse amplitude (Pulse AMP) to the Base Heater Power is applied to the heater H. At this time, when the time period of the Pulse_High_Pitch is sufficiently long, pushing out of the head element 10A corresponding to the pulse amplitude occurs. On the other hand, when the time period of the Pulse_High_Pitch is short, the heater power begins to decrease before pushing out corresponding to the pulse amplitude occurs. Accordingly, the spacing exhibits the wavelike changes as shown on the lower side of FIG. 9.

Each of FIGS. 10 to 13 is a view showing examples of the HDI-DC output of a case where the heater power is increased by an amount corresponding to the pulse amplitude, and HDI-DC output of a case where the heater power is decreased by the amount corresponding to the pulse amplitude. FIG. 10 is a view showing an example of the HDI-DC output at the time when the heater power is changed. FIG. 11 is a view obtained by enlarging a part of FIG. 10. FIG. 12 is a view showing an example of the HDI-DC output (low frequency) at the time of pulse drive. FIG. 13 is a view showing an example of the HDI-DC output (high frequency) at the time of pulse drive. It should be noted that in each of FIGS. 10 to 13, the axis of abscissa indicates the time, and axis of ordinate indicates the percentage of the case where the maximum change amount (saturated state) is made 100%.

More specifically, FIG. 10 shows an example in which the time required by the DC output of the HDI sensor S to become sufficiently saturated is observed for each of the case where the heater power to be applied to the heater H is changed, at the time 0, to the increased electric power (Low to High) and case where the heater power to be applied to the heater H is changed to the decreased electric power (High to Low). In FIG. 10, it is shown that the output of the HDI sensor S takes about 4 msec to become saturated both when the electric power to be applied to the heater H is increased, and to become 0 when the electric power is decreased.

More specifically, FIG. 11 is a view obtained by enlarging a part of the situation of FIG. 10 expressed in terms of time in which the electric power to be applied to the heater is changed, the part being 0 msec to 1 msec. As shown in FIG. 11, even when the CPU 14 changes the electric power to be applied to the heater H, the follow-up of heat generation by the heater H is delayed from the change in the electric power, and hence it is more clearly shown that the DC output value of the HDI sensor S changes with a certain time constant.

Accordingly, as shown in FIG. 12, pulse drive configured in such a manner that the time of about 4 msec (low frequency) within which the DC output of the HDI sensor S becomes sufficiently saturated is made a half cycle is executed. It is shown that when the CPU 14 applies electric power of such pulse drive to the heater H, saturation of the output value of the HDI sensor S at the time of pulse drive attains a change of approximately 100% relatively to the applied amplitude (AMP).

On the other hand, as shown in FIG. 13, it is shown that when pulse drive having the time of 52 μsec (high frequency) as a half cycle is executed, saturation of the DC output of the HDI sensor S makes a change falling short of 100% relatively to the pulse amplitude (Pulse AMP). In FIG. 13, it is shown that saturation of the output value of the HDI sensor S at the time of pulse drive attains a change of approximately 70%.

In this embodiment, it is necessary to pulse-drive the heater H. Accordingly, hereinafter, the determination method of the pulse amplitude will be described with reference to FIGS. 14 to 17.

Each of FIGS. 14 to 17 is a view showing an example of each of a change (solid line shown: first relational expression) in the DC output of the HDI sensor S relative to the base heater power at the time of pulse drive observed at only the output maximum point (max-point) of the DC output of the HDI sensor S described in connection with already-described FIG. 12, and change (broken line shown: second relational expression) in the DC output of the HDI sensor S relative to the base heater power at the time of pulse drive observed at only the output minimum point (min-point) of the DC output of the HDI sensor S. Further, in FIGS. 14 to 17, it is assumed that the pulse period is made sufficiently large, and DC output of the HDI sensor at the time of pulse drive of the heater H sufficiently attains saturation as in the case of already-described FIG. 12.

At the output maximum point of the DC output of the HDI sensor S at the time of pulse drive, the power is equivalent to the heater power shifted (increased) by an amount corresponding to the pulse amplitude relatively to the base heater power, and hence characteristic curves different from each other can be obtained at the output maximum point and output minimum point. Further, as shown in FIG. 14, when the pulse amplitude is large (pulse amplitude: 120), the characteristic curve (solid line shown in FIG. 14) indicating the measured value of the output maximum point and characteristic curve (broken line shown in FIG. 14) indicating the measured value of the output minimum point do not intersect each other.

Next, the case where the pulse amplitude is decreased as compared with the case of FIG. 14 will be described below. When the state where the pulse amplitude is decreased as described above is brought about (in FIG. 15, the pulse amplitude is 90, in FIG. 16, pulse amplitude is 60, and in FIG. 17, pulse amplitude is 30), as shown in FIGS. 15 to 17, a point at which the characteristic curve (solid line shown) indicating the measured value of the output maxim point and characteristic curve (broken line shown) indicating the measured value of the output minimum point intersect each other occurs. In order to realize the touchdown (contact between the magnetic disk and magnetic head) detecting method to be described later, it is necessary to set the pulse amplitude in advance in such a manner that both the characteristic curves intersect each other, as shown FIG. 16, in the section of the point Pb of already-described FIG. 8.

Further, regarding the measurement of the DC output of the HDI sensor S, it is necessary to measure the characteristics of the case where the contact is advanced up to the COC layer 22 of the magnetic disk. Accordingly, there is a possibility of the magnetic head 10 being damaged by the contact concerned. Therefore, it is desirable that representative characteristic values be acquired and determined in advance, and that the characteristic values concerned be stored in, for example, the flash ROM 16 or in the data management area of the magnetic disk 2. Thereby, in the magnetic disk device 1 of this embodiment, in the adjustment of the product at the time of shipment, it is possible to avoid execution of the measurement concerned, and avoid damage to the magnetic head 10 before shipment.

Furthermore, regarding the determination method of the pulse frequency at the time of pulse drive, it is desirable in order to shorten the measurement time to the utmost that the pulse frequency be made higher, and both the state where the pulse amplitude is high, and state where the pulse amplitude is low be created.

As in the state of already-described FIG. 13, regarding the DC output of the HDI sensor S, there is a possibility of a frequency leading to no full saturation corresponding to the pulse amplitude being selected. In this case, it is sufficient if the pulse amplitude is adjusted in such a manner as to make the pulse amplitude a pulse amplitude making it possible to obtain the relationship shown in, for example, already-described FIG. 16.

Next, the detection method of a touchdown will be described.

Figure 18:
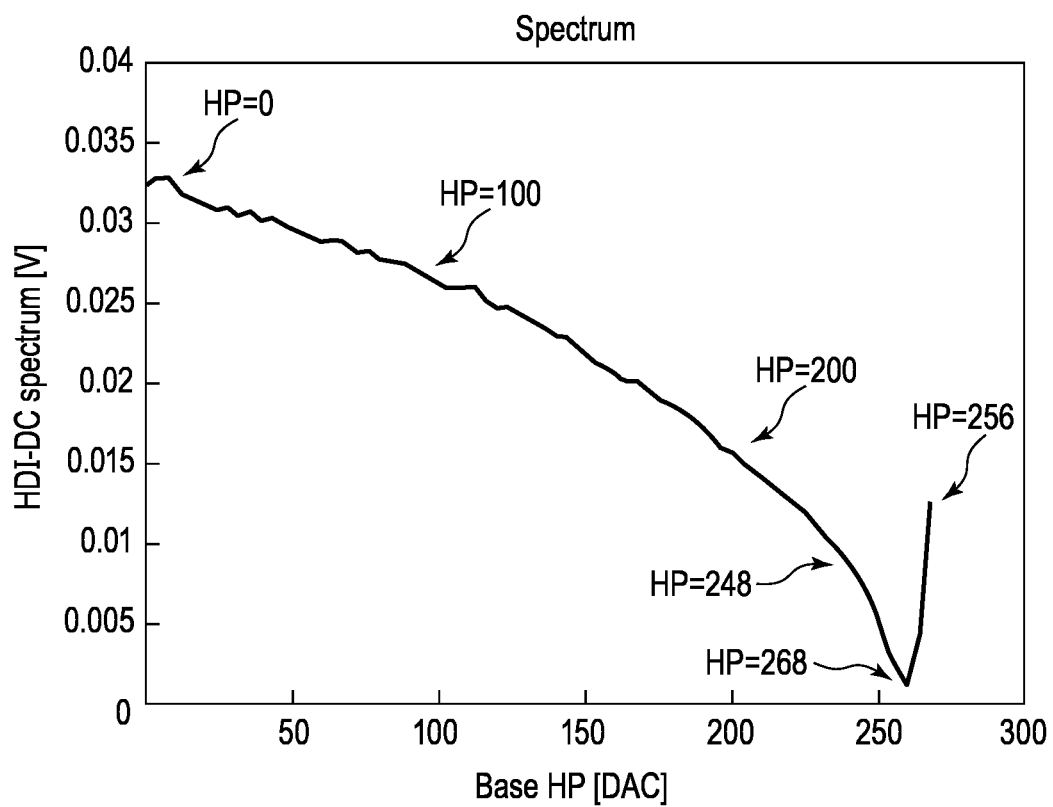
FIG. 18 is a view showing an example of a state of observing the DC output value of the sensor S while using the pulse drive and gradually increasing the base heater power from 0 according to the first embodiment.
Figure 19:
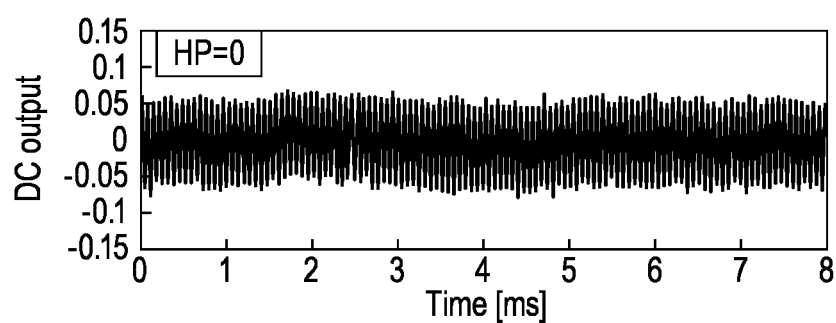
FIG. 19 is a view showing an example of a relationship between the time and DC output when the heater power is "0" according to the first embodiment.

Each of FIGS. 18 to 24 is a view showing an example of the state where the CPU 14 observes the DC output value of the HDI sensor S while using the pulse drive described in connection with already-described FIG. 9, and gradually increasing the base heater power from 0. In FIG. 18, the axis of abscissa indicates the base heater power, and axis of ordinate indicates the spectrum of the DC output of the HDI sensor S. Each of FIGS. 19 to 24 is a view showing an example of a relationship between the time and DC output of each of the cases where the heater power is set at "0", "100", "200", "248", "256", and "268". It should be noted that DAC which is the unit of the base heater power is a unit of electric power applicable to the heater H and settable to the preamplifier 11.

As shown in FIGS. 19 to 24, the amplitude of the DC output of the HDI sensor S relative to the time axis of a case where the base heater power HP is changed varies. It is assumed that a spectrum obtained by the CPU 14 by discrete Fourier transform (DFT) by using certain base heater power p (HP=p), and frequency (hereinafter referred to as the pulse frequency) having the pulse high pitch and pulse low pitch of the DC output of the HDI sensor S as one period is h (p). Then, as shown by the relationship obtained by plotting a relationship between p and h (p), i.e., as shown by the graph of FIG. 18, regarding h (p), it can be seen that the minimum value of the HDI-DC spectrum of the HDI sensor S is obtained at certain heater power. In this embodiment, the minimum value is obtained at the heater power of 268 (HP=268).

Each of FIGS. 25 to 27 is a view schematically showing an example of a change in the DC output of the HDI sensor S relative to the heater power HP of the pulse amplitude width. FIG. 25 is a view showing an example of a state of low heater power, FIG. 26 is a view showing an example of a state immediately before a touchdown is detected, and FIG. 27 is a view showing an example of a state where the touchdown is detected.

In each of FIGS. 25 to 27, as an example of the change, a result of obtaining the converted values of the AD converter 114 of a case where the heater power is applied to the heater H two times for each of the pulse high pitch and pulse low pitch is shown. It should be noted that the set of the pulse high pitch and pulse low pitch of the first time is defined as the pulse cycle 1, and set of pulse high pitch and pulse low pitch of the second time is defined as the pulse cycle 2.

As shown in FIG. 25, in the state where the base heater power is low heater power, in the change in the heat of the HDI sensor S, pulse drive of the heater power becomes the main body. Accordingly, the resistance value becomes largest at the positions of the points c1 and c2 at which the state where the heater power is the highest has continued, and DC output value of the HDI sensor S also becomes largest at these points c1 and c2. On the other hand, the resistance value becomes smallest at the positions of the points a1 and a2 at which the state where the heater power is the lowest has continued, and DC output value of the HDI sensor S also becomes smallest at these points a1 and a2.

When the CPU 14 gradually increases the base heater power from this state, the output difference between the point c1 and point a1 becomes small as in the state immediately before the touchdown shown in FIG. 26. This is because, as already described, when the spacing is made smaller, the DC output value of the HDI sensor S becomes susceptible to the influence of air cooling resulting from the rotation of the magnetic disk 2. More specifically, this is because, on the basis of the levitation change of the magnetic head 10 described in connection with already-described FIG. 8, in the section of the pulse high pitch, the spacing becomes smaller by the application of the greater electric power to the heater H than in the section of the pulse low pitch, heat generation by the heater H and influence of air cooling cancel out each other, and the change in the DC output value at the point c1 becomes smaller than the time of the low heater power of FIG. 25.

When the CPU 14 further increases the base heater power, contact between the Lube layer 21 of the magnetic disk 2 and head element 10A of the magnetic head 10 begins from the section of the pulse high pitch. When the contact between the Lube layer 21 and head element 10A occurs, a phenomenon in which the magnetic disk 2 assumes a role of a heat sink, whereby the heat of the HDI sensor S abruptly lowers occurs.

For this reason, finally, the output difference between the DC output in the section of the pulse high pitch and DC output in the section of the pulse low pitch is reversed as in the touch down state shown in FIG. 27, and the pulse amplitude becomes larger again. Due to such a phenomenon, as described in connection with already-described FIG. 18, a phenomenon in which h (p) exhibits a minimum value with respect to p occurs. Accordingly, it can be determined that p at which h (p) becomes minimum is in the vicinity of the start of a touchdown. Therefore, by obtaining the heater power concerned, it becomes possible for the CPU 14 to determine the touchdown power. In this embodiment, the value of the touchdown power obtained in this way is stored in the flash ROM 16 or in the management data area of the magnetic disk 2, and the touchdown is determined when the electric power value of the heater power is less than or equal to the threshold, whereby it is possible to avoid the contact between the magnetic disk 2 and head element 10A in the inspection at the time of shipment of the magnetic disk device 1.

Further, it is necessary for the CPU 14 to obtain the actually applied maximum power as the touchdown power. It becomes possible for the CPU 14 to obtain such touchdown power by cumulatively adding the ratio of the maximum value of the DC output of the HDI sensor determined by the pulse amplitude and pulse frequency to the pulse amplitude, and adding the resultant to the base heater power.

Furthermore, in this embodiment, a spectrum (see FIG. 18) is used for the determination of the touchdown power to be executed by the CPU 14. This is because, by using the spectrum as described above, it becomes possible for the CPU 14 not to pick up frequency components resulting from deformation, surface roughness, and the like of the magnetic disk 2 other than the pulse amplitude, and the measured value of the DC output of the HDI sensor S becomes more accurate. Accordingly, when the frequency components resulting from deformation, surface roughness, and the like of the magnetic disk 2 can practically be neglected, the CPU 14 may regard the absolute value of the difference between the DC output value of the HDI sensor S at the maximum point of the pulse amplitude shown in already-described FIG. 16 and DC output value of the HDI sensor S at the minimum point as the substitute value of the spectrum. Accordingly, it is sufficient if the CPU 14 determines the pulse amplitude in advance, as shown in FIG. 16, in such a manner that the value in the vicinity of a point at which the difference between the DC output value of the HDI sensor S of the maximum point and DC output value of the HDI sensor S of the minimum point becomes 0 is made the threshold (section Pb of FIG. 8) of touchdown determination, and stores the determined pulse amplitude in, for example, the flash ROM 16. The magnetic disk device 1 may also be configured in the manner described above.

As described above, it becomes possible for the magnetic disk device 1 to carry out the touchdown determination in the state where pulsed electric power is applied to the heater H, and on the basis the spectrum of the pulse frequency of the DC output of the HDI sensor S. Accordingly, it is possible to avoid contact between the magnetic disk 2 and head element 10A of the magnetic head 10 in the inspection at the time of shipment of the magnetic disk device 1.

Second Embodiment

In this embodiment, the method of determining touchdown power by prediction will be described as a method utilizing the phenomenon in which the minimum value of the HDI-DC spectrum of the HDI sensor S can be obtained at certain heater power described in connection with already-described FIG. 18. It should be noted that configurations identical to the first embodiment are denoted by reference symbols identical to the first embodiment, and detailed descriptions of these configurations are omitted.

In each of FIGS. 28 to 30, the axis of abscissa indicates base heater power (base HP), and axis of ordinate indicates the spectrum of the HDI-DC output. FIG. 28 is a view showing an example of a relationship of the predicted touchdown power with the measured power obtained by measuring the heater power at the heater power HP of 100 (heater power HP=100). FIG. 29 is a view showing an example of a relationship of the predicted touchdown power with the measured power obtained by measuring the heater power at the heater power HP of 200 (heater power HP=200). FIG. 30 is a view showing an example of a relationship of the predicted touchdown power with the measured power obtained by measuring the heater power at the heater power HP of 252 (heater power HP=252). FIG. 31 is a view showing an example of a difference between the predicted touchdown power and measured power (DAC), and the axis of abscissa indicates the measured power (DAC), and axis of ordinate indicates the difference between the predicted touchdown power and measured power (DAC). In FIG. 31, as in the case of FIGS. 28 to 30, the power measured at each amount of the base heater power and predicted touchdown power are used to form the graph.

As shown in FIG. 28, a tangential line is obtained from the quadratic function calculated on the basis of the measured power from the HP0 to the HP100 at the base heater power HP100 and, when the predicted touchdown power p at which the spectrum h (p) of the HDI-DC output becomes 0 is obtained by using the tangential line concerned, p is about 310 (p=310). As shown in FIG. 29, a tangential line is obtained from the quadratic function calculated on the basis of the measured power from around the HP100 to the HP200 at the base heater power HP200 and, when the predicted touchdown power p at which the spectrum h (p) of the HDI-DC output becomes 0 is obtained by using the tangential line concerned, p is about 270 (p=270). As shown in FIG. 30, a tangential line is obtained from the quadratic function calculated on the basis of the measured power from the HP150 to the HP252 at the base heater power HP250 and, when the predicted touchdown power p at which the spectrum h (p) of the HDI-DC output becomes 0 is obtained by using the tangential line concerned, p is about 260 (p=260).

The spectrum h (p) in the vicinity of the predicted touchdown power p obtained in this way is sufficiently smaller than h (p) at the time when p is 0 (p=0) and is approximately 0 in the vicinity of the touchdown. Further, in the vicinity of the touchdown, the influence of cooling due to the rotation of the magnetic disk 2 becomes conspicuous, and the inclination of the spectrum h (p) relative to the predicted touchdown power p becomes steep. By utilizing these phenomena to create a high order expression with several samples of data including the measured power, and p and h (p), and heater power p at which the spectrum of the DC output of the HDI sensor S becomes lower than or equal to a certain threshold (in FIGS. 28 to 31, the threshold is made 0 (h (p)=0)) is predicted by using the tangential line of the measured power. It is assumed in this embodiment that the created high order expression is to be stored in the flash ROM 16.

When carrying out touchdown determination, the CPU 14 stops measurement of the heater power at a point in time when the difference between the predicted touchdown power obtained by using the high order expression and measured power becomes less than or equal to the predetermined threshold (10 in FIG. 31), and regards the predicted touchdown power at the point in time when the measurement is stopped as the touchdown power. In the example of FIG. 31, in the actual measurement, in order that the heater power may acquire the minimum value, it is necessary to apply heater power to the heater H until the 260DAC is obtained. On the other hand, in this embodiment, the CPU 14 can determine the touchdown at the 252DAC at which the difference between the predicted touchdown power and measured power becomes 10 or less, and hence the CPU 14 can complete the measurement at the 252DAC.

FIG. 32 is a flowchart showing an example of prediction processing of the touchdown power according to this embodiment. The prediction processing is realized by the CPU 14 by executing the program stored in the flash ROM 16.

As shown in FIG. 32, the CPU 14 sets the heater power p at 0 (p=0) (ST101), and measures the spectrum h (p) of the DC output of the HDI sensor S (ST102). Next, the CPU 14 determines whether or not the heater power p is greater than or equal to the measured point number a for creation of the approximate expression (ST103). The approximate expression is a high order expression, and hence the measured point needs to be a measured point of the order higher than or equal to the order of the high order expression. Upon determination that p is greater than or equal to a (ST103: YES), the CPU 14 calculates the approximate expression f (n) (n is p−a to p) (ST104).

Next, the CPU 14 obtains the tangential line of the approximate expression at p (n=p), and predicts the heater power x at which the tangential line becomes less than or equal to the spectrum touchdown determination value c (ST105). The spectrum of the DC output of the HDI sensor S becomes abruptly small in the vicinity of the touchdown, and hence, as described already, the difference between the predicted touchdown power x obtained on the basis of the tangential line and measured heater power p becomes small.

Next, the CPU 14 determines whether or not x−p is less than or equal to the threshold e (ST106). Here, the threshold e is 10DAC in the example of FIG. 31. Upon determination that x−p is less than or equal to the threshold e (ST106: YES), the CPU 14 determines x to be the predicted touchdown power (ST107).

On the other hand, when it is determined that x−p exceeds the threshold e (ST106: NO) or when it is determined in step ST103 that p is not greater than or equal to a (ST103: NO), DC output spectrum minimum value determination is executed in preparation for the case where the touchdown power cannot be detected in the prediction determination. The CPU 14 determines whether or not p is greater than or equal to b (ST108) and, when it is determined that p is greater than or equal to b (ST108: YES), it is determined whether or not h (p−b) is less than h (p) and h (p−b) is less than or equal to the spectrum touchdown determination value d (ST109). Here, a value different from c may also be set as d. Upon determination that h (p−b) is less than h (p) and h (p−b) is less than or equal to d (ST109: YES), the CPU 14 determines that the spectrum minimum value is detected at a value less than or equal to the touchdown determination value d, and determines (p−b) to be the touchdown power (ST110).

Further, upon determination that p is not greater than or equal to b (ST108: NO) or upon determination that h (p−b) is not less than h (p) and h (p−b) is not less than or equal to d (ST109: NO), the CPU 14 adds the predetermined value b to p (ST111). In the examples of FIGS. 28 to 31, b is 4DAC. Then, the processing is returned to the processing of step ST102. Thereby, on the basis of new p to which b is added, the already-described processing is repeated. In this manner, the predicted touchdown power is determined.

FIG. 33 is a view showing an example of a result of obtaining the touchdown power (spectrum minimum power) h (p) of which becomes minimum in the measured value and predicted touchdown power obtained by carrying out the processing of FIG. 32 at a plurality of magnetic heads 10 included in the magnetic disk device 1 and at both the outer circumferential position and inner circumferential position of the magnetic disk.

As shown in FIG. 33, a correlation between the touchdown power which becomes minimum in the measured value and predicted touchdown power is obtained. Accordingly, it can be understood that the prediction method of the touchdown power of this embodiment does not cause a large difference.

It should be noted that although in FIGS. 28 to 32 of this embodiment, the case where the tangential line is obtained from the quadratic function calculated on the basis of the measured power, and the predicted touchdown power is obtained by using the tangential line concerned has been described, the method of obtaining the predicted touchdown power is not limited to this. For example, the CPU 14 may obtain the predicted touchdown power by substituting a value of the heater power greater than the measured heater power into the approximate expression, and carrying out processing in which certain h (p) becomes less than or equal to a certain threshold to thereby regard the heater power which becomes less than or equal to the threshold concerned as the predicted touchdown power.

Further, when the frequency components resulting from deformation, surface roughness, and the like of the magnetic disk 2 can be neglected, the CPU 14 may obtain the predicted touchdown power by creating an approximate curve of each of the DC output maximum point and output minimum point of the HDI sensor S shown in each of FIGS. 14 to 17, and calculating the point at which the difference between these approximate curves becomes 0 in each of FIGS. 14 to 17 to thereby regard the heater power of the point concerned as the predicted touchdown power.

In this embodiment, the magnetic disk device 1 carries out an approximation of the frequency spectrum of the heater power and pulse drive by means of a high order expression, and predicts the touchdown by power less than the actually measured touchdown power, whereby the magnetic disk device 1 can complete the measurement of the touchdown determination. Accordingly, it is possible to avoid the contact between the magnetic disk 2 and head element 10A of the magnetic head 10 in the inspection at the time of shipment of the magnetic disk device 1 and when the user uses the magnetic disk device 1 after the shipment thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
a magnetic disk;
a magnetic head including a read head configured to read data from the magnetic disk, a write head configured to write data to the magnetic disk, a heater configured to adjust a distance between the magnetic disk and the magnetic head, and a sensor configured to detect the distance; and
a control section configured to adjust the distance by applying electric power to the heater, wherein
when applying electric power to the heater, the control section predicts, on the basis of a relationship between a value of the electric power to be applied to the heater and an output value of a spectrum at a pulse frequency of a DC output of the sensor in a state where pulsed electric power is applied to the heater, the output value of the spectrum, and detects contact between the magnetic head and the magnetic disk before the predicted output value of the spectrum becomes less than or equal to a threshold.

2. The magnetic disk device of claim 1, wherein
the threshold is determined on the basis of a first relational expression indicating a relationship between the value of the electric power to be applied to the heater and a maximum value of the DC output of the sensor, and a second relational expression indicating a relationship between the value of the electric power to be applied to the heater and a minimum value of the DC output of the sensor, and on the basis of a difference between a first electric power value of the first relational expression and a second electric power value of the second relational expression, the first relational expression and the second relational expression being at the same electric power value.

3. The magnetic disk device of claim 1, wherein
the threshold is a value less than the electric power value of the heater at which the magnetic head comes into contact with the magnetic disk.

4. The magnetic disk device of claim 1, wherein
the threshold is stored in a storage section with which the control section can carry out communication.

5. The magnetic disk device of claim 1, wherein
the threshold is a value less than the electric power value of the heater at which the magnetic head and the magnetic disk come into contact with each other obtained from a result of measurement of measuring, by means of a magnetic disk device of the same type as the magnetic disk device, a relationship between the value of the electric power to be applied to the heater, and the output value of a spectrum at a pulse frequency of the DC output of the sensor in a state where pulsed electric power is applied to the heater.

6. A magnetic disk device comprising:
a magnetic disk;
a magnetic head including a read head configured to read data from the magnetic disk, a write head configured to write data to the magnetic disk, a heater configured to adjust a distance between the magnetic disk and the magnetic head, and a sensor configured to detect the distance; and
a control section configured to adjust the distance by applying electric power to the heater, wherein
when applying electric power to the heater, the control section determines the electric power value of the heater at which the magnetic head and the magnetic disk come into contact with each other on the basis of a change in the value of the electric power to be applied to the heater and a change in the output value of the spectrum at the pulse frequency of the DC output of the sensor in the state where pulsed electric power is applied to the heater.

7. The magnetic disk device of claim 6, wherein
a threshold of determining the electric power value of the heater at which the magnetic head and the magnetic disk come into contact with each other is determined on the basis of a first relational expression indicating a relationship between the value of the electric power to be applied to the heater and a maximum value of the DC output of the sensor, and a second relational expression indicating a relationship between the value of the electric power to be applied to the heater and a minimum value of the DC output of the sensor, and on the basis of a difference between the first electric power value of the first relational expression and the second electric power value of the second relational expression, the first relational expression and the second relational expression being at the same electric power value.

8. A contact detecting method of a magnetic disk device including
a magnetic disk,
a magnetic head including a read head configured to read data from the magnetic disk, a write head configured to write data to the magnetic disk, a heater configured to adjust a distance between the magnetic disk and the magnetic head, and a sensor configured to detect the distance, and
a control section configured to adjust the distance by applying electric power to the heater, comprising:
when electric power is applied to the heater by the control section,
predicting, on the basis of a relationship between a value of the electric power to be applied to the heater and an output value of a spectrum at a pulse frequency of a DC output of the sensor in a state where pulsed electric power is applied to the heater, the output value of the spectrum, and detecting contact between the magnetic head and the magnetic disk before the predicted output value of the spectrum becomes less than or equal to a threshold.

\* \* \* \* \*